United States Patent
Guo et al.

(10) Patent No.: US 12,402,104 B2
(45) Date of Patent: Aug. 26, 2025

(54) METHOD AND APPARATUS FOR DETERMINING TRANSPORT BLOCK SIZE

(71) Applicant: HUAWEI TECHNOLOGIES CO., LTD., Shenzhen (CN)

(72) Inventors: Wenting Guo, Shanghai (CN); Hongjia Su, Shanghai (CN); Lei Lu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 380 days.

(21) Appl. No.: 17/961,386

(22) Filed: Oct. 6, 2022

(65) Prior Publication Data
US 2023/0047000 A1    Feb. 16, 2023

Related U.S. Application Data

(63) Continuation of application No. PCT/CN2021/085732, filed on Apr. 6, 2021.

(30) Foreign Application Priority Data

Apr. 10, 2020  (CN) .......................... 202010281605.8

(51) Int. Cl.
*H04W 72/044* (2023.01)
*H04L 5/00* (2006.01)
*H04W 72/53* (2023.01)

(52) U.S. Cl.
CPC ......... *H04W 72/044* (2013.01); *H04L 5/0051* (2013.01); *H04W 72/53* (2023.01)

(58) Field of Classification Search
CPC .... H04L 5/0051; H04W 72/044; H04W 72/53
See application file for complete search history.

(56) References Cited

U.S. PATENT DOCUMENTS

| 2021/0211219 A1* | 7/2021 | Sarkis | H04L 5/0044 |
| 2022/0201711 A1* | 6/2022 | Lee | H04W 72/20 |

FOREIGN PATENT DOCUMENTS

| CN | 108781454 A | 11/2018 |
| WO | 2019073464 A1 | 4/2019 |

OTHER PUBLICATIONS

LG Electronics, "Discussion on physical layer structure for NR sidelink," 3GPP TSG RAN WG1 #99, Reno, USA, R1-1913235, Total 36 pages, 3rd Generation Partnership Project, Valbonne, France (Nov. 18-22, 2019).

(Continued)

*Primary Examiner* — Brian P Cox
(74) *Attorney, Agent, or Firm* — Leydig, Voit & Mayer, Ltd.

(57) ABSTRACT

A method for determining a transport block size includes: determining an overhead of a sidelink data channel PSSCH demodulation reference signal (DMRS) in a physical resource block (PRB) of a first time-frequency resource, where the first time-frequency resource includes a first time unit in time domain; and determining, based on the overhead of the PSSCH DMRS, a number of resource elements (REs) on the first time-frequency resource that are for data transmission, where the number of REs for data transmission is for determining a transport block size (TBS) of the sidelink data channel PSSCH. The method provides a combined gain of a plurality of transmissions of a same transport block, and supports DMRS configurations of different quantities of DMRS symbols in initial transmission and retransmission of one transport block.

15 Claims, 8 Drawing Sheets

(56) References Cited

OTHER PUBLICATIONS

Vivo, "Remaining issues on physical layer structure for NR sidelink," 3GPP TSG RAN WG1 #100, e-Meeting, R1-2000315, Total 11 pages, 3rd Generation Partnership Project, Valbonne, France (Feb. 24-Mar. 6, 2020).
LG Electronics, "Discussion on physical layer structure for NR sidelink," 3GPP TSG RAN WG1 Meeting #100, e-Meeting, R1-2000781, Total 32 pages, 3rd Generation Partnership Project, Valbonne, France (Feb. 24-Mar. 6, 2020).
"RS design and other physical layer design issues for NR V2X sidelink," 3GPP TSG RAN WG1 #98b, Chongqing, China, R1-1910179, Total 18 pages 3rd Generation Partnership Project, Valbonne, France (Oct. 14-20, 2019).
"Remaining issues on physical layer structure for NR sidelink," 3GPP TSG RAN WG1 #100 e-Meeting, R1-2000520, Total 15 pages, 3rd Generation Partnership Project, Valbonne, France (Feb. 24-Mar. 6, 2020).
"3rd Generation Partnership Project; Technical Specification Group Radio Access Network; NR; Multiplexing and channel coding (Release 16)," 3GPP TS 38.212 V16.1.0, pp. 1-146, 3rd Generation Partnership Project, Valbonne, France (Mar. 2020).
"Discussion on physical layer structure for NR sidelink," 3GPP TSG RAN WG1 #99, R1-1912586, Reno, USA, Total 34 pages, 3rd Generation Partnership Project, Valbonne, France (Nov. 18-22, 2019).
"3rd Generation Partnership Project; Technical Specification Group Radio Access Network; NR; Physical layer procedures for control (Release 16)," 3GPP TS 38.213 V16.1.0, pp. 1-156, 3rd Generation Partnership Project, Valbonne, France (Mar. 2020).
"Remaining details of sidelink physical layer structure," 3GPP TSG RAN WG1 Meeting #100-e, R1-2000181, Total 26 pages, 3rd Generation Partnership Project, Valbonne, France (Feb. 24-Mar. 6, 2020).
"3rd Generation Partnership Project; Technical Specification Group Radio Access Network; NR; Physical layer procedures for data (Release 16)," 3GPP TS 38.214 V16.1.0, pp. 1-151, 3rd Generation Partnership Project, Valbonne, France (Mar. 2020).
"Remaining issues on sidelink physical layer structure," 3GPP TSG RAN WG1 #100, e-Meeting, R1-2000914, Total 16 pages, 3rd Generation Partnership Project, Valbonne, France (Feb. 24-Mar. 6, 2020).
"3rd Generation Partnership Project; Technical Specification Group Radio Access Network; NR; Radio Resource Control (RRC) protocol specification (Release 16)," 3GPP TS 38.331 V16.0.0, pp. 1-835, 3rd Generation Partnership Project, Valbonne, France (Mar. 2020).
"Considerations on Physical Layer aspects of NR V2X," 3GPP TSG RAN WG1 Meeting #100-e, R1-2000962, Total 22 pages, 3rd Generation Partnership Project, Valbonne, France (Feb. 24-Mar. 6, 2020).
"5G V2X with NR sidelink," 3GPP TSG RAN meeting #87e, Electronic Meeting, RP-200128, Total 25 pages, 3rd Generation Partnership Project, Valbonne, France (Mar. 16-19, 2020).
"Remaining details of Physical layer structure for sidelink," 3GPP TSG RAN WG1 #100-e, Ad Hoc meeting, R1-2000382, Total 8 pages, 3rd Generation Partnership Project, Valbonne, France (Feb. 24-Mar. 6, 2020).
"Remaining details on physical layer structure for the sidelink," 3GPP TSG RAN WG1 Meeting #100-e, e-Meeting, R1-2000564, Total 8 pages, 3rd Generation Partnership Project, Valbonne, France (Feb. 24-Mar. 6, 2020).

* cited by examiner

FIG. 3

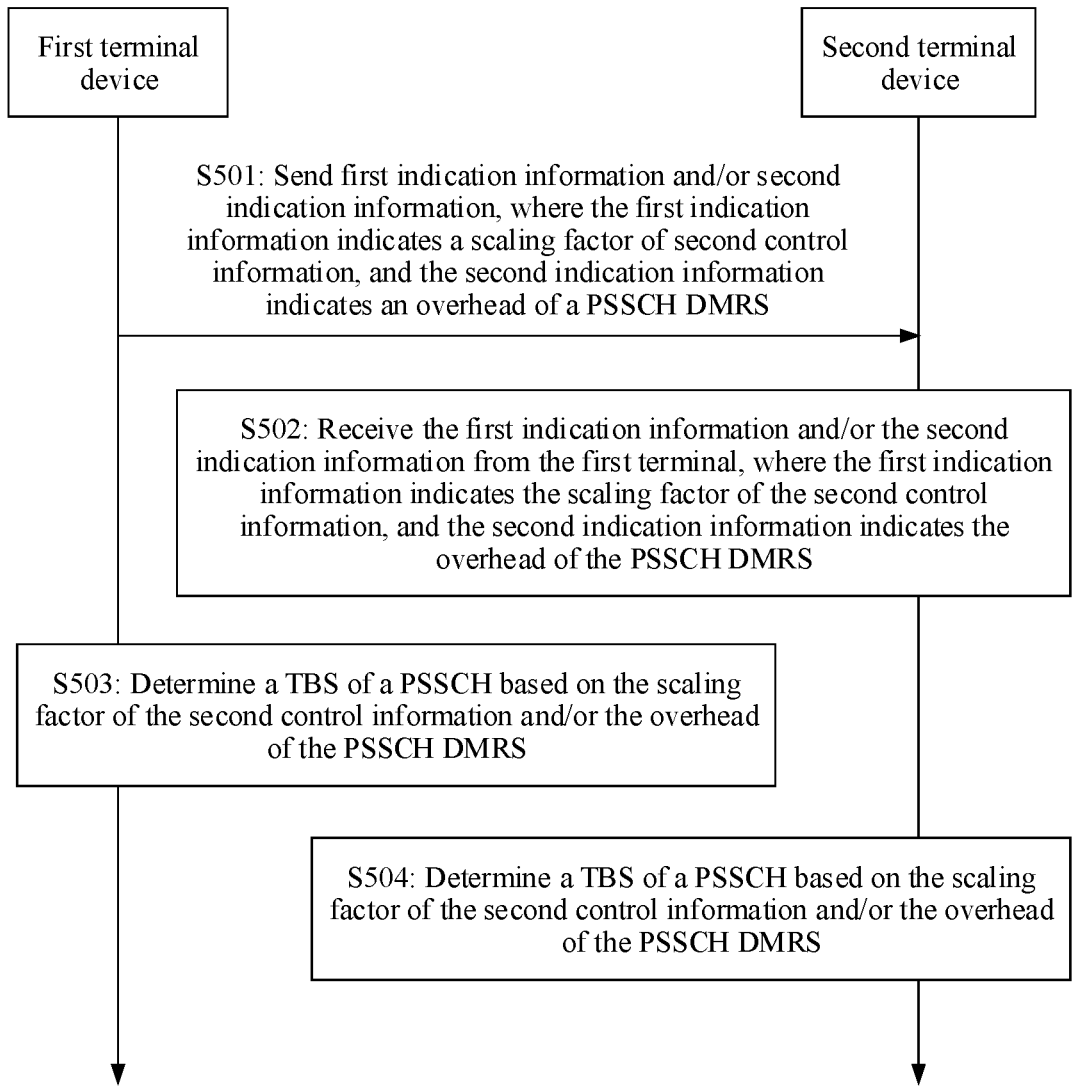

FIG. 9

METHOD AND APPARATUS FOR DETERMINING TRANSPORT BLOCK SIZE

CROSS-REFERENCE TO RELATED APPLICATIONS

This application is a continuation of International Application No. PCT/CN2021/085732, filed on Apr. 6, 2021, which claims priority to Chinese Patent Application No. 202010281605.8, filed on Apr. 10, 2020. The disclosures of the aforementioned applications are hereby incorporated by reference in their entireties.

TECHNICAL FIELD

This application relates to the field of internet of vehicles technologies, and in particular, to a method and an apparatus for determining a transport block size.

BACKGROUND

In a communication system, data is organized into transport blocks (TBs) for transmission. Before a TB is transmitted, a transport block size (TBS) needs to be first determined based on a number of resource elements (REs) for data transmission.

A current standard defines how to determine a number of REs for data transmission through an air interface. However, in a vehicle to everything (V2X) scenario, because a frame structure is different from an air interface frame structure, the method defined in the current standard is no longer applicable. Therefore, a method for determining a transport block size needs to be provided for the V2X scenario.

SUMMARY

This application provides a method and an apparatus for determining a transport block size. The method and the apparatus may be applied to internet of vehicles, for example, vehicle to everything (V2X) communication, long term evolution-vehicle (LTE-V) communication, and vehicle to vehicle (V2V) communication, or may be applied to fields such as intelligent driving and intelligent connected vehicles. This solution can achieve a combined gain of a plurality of transmissions of a same transport block, and support demodulation reference signal (DMRS) configurations of different quantities of DMRS symbols in initial transmission and retransmission of one transport block. In this way, when a channel state changes, the channel estimation accuracy can be improved by adjusting the number of DMRS symbols, to ensure the transmission reliability of the transport block.

According to a first aspect, a method for determining a transport block size is provided. The method may be applied to a V2X transmit end, or may be applied to a V2X receive end. The method includes: determining an overhead of a sidelink data channel PSSCH demodulation reference signal DMRS in a physical resource block PRB of a first time-frequency resource, where the first time-frequency resource includes a first time unit in time domain, and may include one subchannel or a plurality of continuous subchannels in frequency domain, a PSSCH and the PSSCH DMRS may occupy the one subchannel or the plurality of continuous subchannels, and the PSCCH may occupy a plurality of continuous PRBs in one subchannel; and determining, based on the overhead of the PSSCH DMRS, a number of resource elements REs on the first time-frequency resource that are for data transmission. The number of REs on the first time-frequency resource that are for data transmission may be replaced with a number of available REs on the first time-frequency resource or a number of REs on the first time-frequency resource that are allocated for the PSSCH. The number of REs for data transmission is for determining a transport block size TBS of the PSSCH.

In the foregoing technical solution, for initial transmission or retransmission of data, both the transmit end and the receive end may first determine the overhead of the PSSCH DMRS in the PRB of the first time-frequency resource, and determine, based on the overhead of the PSSCH DMRS, the number of REs on the first time-frequency resource that are for data transmission. The overhead of the PSSCH DMRS is an average number of REs occupied by the PSSCH DMRS in a plurality of DMRS configurations, instead of an actual number of REs occupied by the PSSCH DMRS in one transmission. Therefore, for initial transmission and retransmission, the number of REs for data transmission remains unchanged, where the number of REs is determined based on the overhead of the PSSCH DMRS, and the TBS determined based on the number of REs for data transmission is the same, so that transport blocks for initial transmission and retransmission in a sidelink communication process can be combined, to achieve a combined gain. In addition, in this solution, the TBS is determined based on the number of REs for data transmission, where the number of REs is determined based on the overhead of the PSSCH DMRS. Therefore, the PSSCH may be allowed to carry different quantities of DMRS symbols in initial transmission and retransmission processes of one TBS. In this way, it can be ensured that when a channel state changes in initial transmission and retransmission processes of one transport block, the channel estimation accuracy can be improved and the transmission reliability can be ensured by increasing the number of DMRS symbols. In addition, when the channel state is good, the throughput of the PSSCH may be increased by reducing the number of DMRS symbols.

In an example implementation of the first aspect, the overhead is an average number of occupied REs, and the overhead of the PSSCH DMRS in one PRB of the first time-frequency resource may be an average number of REs occupied by the PSSCH DMRS in a physical resource including the first time unit in time domain and one PRB in frequency domain.

In an example implementation of the first aspect, the determining an overhead of a PSSCH DMRS in a PRB of a first time-frequency resource includes: determining the overhead of the PSSCH DMRS in one PRB of the first time-frequency resource based on a number of DMRS symbols in each DMRS configuration in a DMRS configuration set corresponding to the first time-frequency resource. The DMRS configuration set corresponding to the first time-frequency resource may be configured by a network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS. In the foregoing example implementation, the PSSCH may be allowed to carry different quantities of DMRS symbols in initial transmission and retransmission processes of one TBS. In addition, different quantities of DMRS symbols are set, so that when a channel state is poor or an SINR decreases, the PSSCH decoding efficiency is improved by increasing the number of DMRS symbols, or when the SINR increases, the throughput of the PSSCH is improved by decreasing the number of DMRS symbols.

In an example implementation of the first aspect, the overhead of the PSSCH DMRS satisfies the following formula:

$$N_{DMRS}^{PRB} = \frac{1}{N}\sum_{n=0}^{N-1}(N_{SC}^{PRB} \times k_n)/P,$$

where $N_{DMRS}^{PRB}$ represents the overhead of the PSSCH DMRS, N represents a number of DMRS configurations in the DMRS configuration set corresponding to the first time-frequency resource, $k_n$ represents a number of DMRS symbols in each DMRS configuration, $N_{SC}^{PRB}$ represents a number of subcarriers in one PRB, and P represents a DMRS frequency domain density, where P is a positive integer.

In an example implementation of the first aspect, the number of REs on the first time-frequency resource that are for data transmission is further related to at least one of the following: a number of subcarriers in one PRB, a number of reference symbols for the PSSCH in one PRB in the first time unit, an overhead of a phase tracking reference signal PTRS and/or an overhead of a channel state information reference signal CSI-RS in one PRB, a number of PRBs included in the PSSCH, an overhead of first control information on the first time-frequency resource, and an overhead of second control information on the first time-frequency resource. In the foregoing example implementation, the plurality of different parameters are considered, so that the number of REs on the first time-frequency resource that are for data transmission can be determined more accurately.

In an example implementation of the first aspect, the number of REs on the first time-frequency resource that are for data transmission satisfies the following formula:

$$N_{RE}=(N_{SC}^{PRB}\times N_{sym}^{sh'}-N_{DMRS}^{PRB}-x)\times M_{PSSCH}^{PRB}-N_{SCI1}-N_{SCI2},$$

where $N_{RE}$ represents the number of REs on the first time-frequency resource that are for data transmission, $N_{SC}^{PRB}$ represents the number of subcarriers in one PRB, $N_{sym}^{sh'}$ represents the number of reference symbols for the PSSCH in one PRB in the first time unit, $N_{DMRS}^{PRB}$ represents the overhead of the PSSCH DMRS in one PRB, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource.

In an example implementation of the first aspect, the number of REs on the first time-frequency resource that are for data transmission satisfies the following formula:

$$N_{RE}=\min(Q,N'_{RE})\times M_{PSSCH}^{PRB}-N_{SCI1}-N_{SCI2},$$

where $N'_{RE}=N_{SC}^{PRB}\times N_{sym}^{sh'}-N_{DMRS}^{PRB}-x$, $N_{RE}$ represents the number of REs on the first time-frequency resource that are for data transmission, Q represents an upper limit of a number of REs in one PRB that are for determining the TBS, $N_{SC}^{PRB}$ represents the number of subcarriers in one PRB, $N_{sym}^{sh'}$ represents the number of reference symbols for the PSSCH in one PRB in the first time unit, $N_{DMRS}^{PRB}$ represents the overhead of the PSSCH DMRS in one PRB, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource.

In the foregoing two example implementations, regardless of whether the PSSCH DMRS and the PSCCH overlap in time domain or do not overlap in time domain, the number of REs on the first time-frequency resource that are for data transmission can be uniquely determined, that is, a TBS of a transport block can be uniquely determined, to achieve a combined gain of a plurality of transmissions of the same transport block.

Optionally, when the method is applied to the transmit end, the method may further include: determining the transport block size based on the determined number of REs for data transmission; and sending a transport block. When the method is applied to the receive end, the method may further include: determining the transport block size based on the determined number of REs for data transmission; and receiving a transport block. In the foregoing example implementation, for initial transmission and retransmission, the number of REs for data transmission is determined based on the overhead of the PSSCH DMRS, and remains unchanged in initial transmission and retransmission, and the TBS determined based on the number of REs for data transmission is the same, so that transport blocks for initial transmission and retransmission in a sidelink communication process can be combined, to achieve a combined gain.

According to a second aspect, an apparatus for determining a transport block size is provided. The apparatus may be applied to a V2X transmit end, or may be applied to a V2X receive end. The apparatus includes: a processing unit, configured to determine an overhead of a sidelink data channel PSSCH demodulation reference signal DMRS in a physical resource block PRB of a first time-frequency resource, where the first time-frequency resource includes a first time unit in time domain. The processing unit is further configured to determine, based on the overhead of the PSSCH DMRS, a number of resource elements REs on the first time-frequency resource that are for data transmission. The number of REs on the first time-frequency resource that are for data transmission may be replaced with a number of available REs on the first time-frequency resource or a number of REs on the first time-frequency resource that are allocated for a PSSCH. The number of REs for data transmission is for determining a transport block size TBS of the PSSCH.

In an example implementation of the second aspect, the overhead is an average number of occupied REs, and the overhead of the PSSCH DMRS in one PRB of the first time-frequency resource may be an average number of REs occupied by the PSSCH DMRS in a physical resource including the first time unit in time domain and one PRB in frequency domain.

In an example implementation of the second aspect, the processing unit is further configured to determine the overhead of the PSSCH DMRS in one PRB of the first time-frequency resource based on a number of DMRS symbols in each DMRS configuration in a DMRS configuration set corresponding to the first time-frequency resource. The DMRS configuration set corresponding to the first time-frequency resource may be configured by a network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS.

In an example implementation of the second aspect, the overhead of the PSSCH DMRS satisfies the following formula:

$$N_{DMRS}^{PRB} = \frac{1}{N}\sum_{n=0}^{N-1}(N_{SC}^{PRB} \times k_n)/P,$$

where $N_{DMRS}^{PRB}$ represents the overhead of the PSSCH DMRS, N represents a number of DMRS configurations in the DMRS configuration set corresponding to the first time-frequency resource, $k_n$ represents a number of DMRS symbols in each DMRS configuration, $N_{SC}^{PRB}$ represents a number of subcarriers in one PRB, and P represents a DMRS frequency domain density, where P is a positive integer.

In an example implementation of the second aspect, the number of REs on the first time-frequency resource that are for data transmission is further related to at least one of the following: a number of subcarriers in one PRB, a number of reference symbols for the PSSCH in one PRB in the first time unit, an overhead of a phase tracking reference signal PTRS and/or an overhead of a channel state information reference signal CSI-RS in one PRB, a number of PRBs included in the PSSCH, an overhead of first control information on the first time-frequency resource, and an overhead of second control information on the first time-frequency resource.

In an example implementation of the second aspect, the number of REs on the first time-frequency resource that are for data transmission satisfies the following formula:

$$N_{RE}=(N_{SC}^{PRB} \times N_{sym}^{sh'}-N_{DMRS}^{PRB}-x) \times M_{PSSCH}^{PRB}-N_{SCI1}-N_{SCI2},$$

where $N_{RE}$ represents the number of REs on the first time-frequency resource that are for data transmission, $N_{SC}^{PRB}$ represents the number of subcarriers in one PRB, $N_{sym}^{sh'}$ represents the number of reference symbols for the PSSCH in one PRB in the first time unit, $N_{DMRS}^{PRB}$ represents the overhead of the PSSCH DMRS in one PRB, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource.

In an example implementation of the second aspect, the number of REs on the first time-frequency resource that are for data transmission satisfies the following formula:

$$N_{RE}=\min(Q,N'_{RE}) \times M_{PSSCH}^{PRB}-N_{SCI1}-N_{SCI2},$$

where $N'_{RE}=N_{SC}^{PRB}*N_{sym}^{sh'}-N_{DMRS}^{PRB}-x$, $N_{RE}$ represents the number of REs on the first time-frequency resource that are for data transmission, Q represents an upper limit of a number of REs in one PRB that are for determining the TBS, $N_{SC}^{PRB}$ represents the number of subcarriers in one PRB, $N_{sym}^{sh'}$ represents the number of reference symbols for the PSSCH in one PRB in the first time unit, $N_{DMRS}^{PRB}$ represents the overhead of the PSSCH DMRS in one PRB, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource.

Optionally, when the apparatus is applied to the transmit end, the apparatus further includes a sending unit. The processing unit is further configured to determine the transport block size based on the determined number of REs for data transmission; and the sending unit is configured to send a transport block. Optionally, when the apparatus is applied to the receive end, the apparatus further includes a receiving unit. The processing unit is further configured to determine the transport block size based on the determined number of REs for data transmission; and the receiving unit is configured to receive a transport block.

According to a third aspect, a method for determining a transport block size is provided. The method may be applied to a V2X transmit end, or may be applied to a V2X receive end. The method includes: determining, based on a number of DMRS configurations in a demodulation reference signal DMRS configuration set corresponding to a first time-frequency resource and a first overhead of a sidelink data channel PSSCH demodulation reference signal DMRS on the first time-frequency resource in each DMRS configuration in the DMRS configuration set, a second overhead of the PSSCH DMRS on the first time-frequency resource, where the first time-frequency resource includes a first time unit in time domain; and determining, based on the second overhead of the PSSCH DMRS, a number of REs on the first time-frequency resource that are for data transmission. The number of REs on the first time-frequency resource that are for data transmission may also be replaced with a number of available REs on the first time-frequency resource or a number of REs on the first time-frequency resource that are allocated for a PSSCH. The number of REs for data transmission is for determining a transport block size TBS of the PSSCH.

In the foregoing technical solution, for initial transmission or retransmission of data, both the transmit end and the receive end may first determine the second overhead of the PSSCH DMRS on the first time-frequency resource, and determine, based on the second overhead of the PSSCH DMRS, the number of REs on the first time-frequency resource that are for data transmission. The second overhead of the PSSCH DMRS is an average number of REs occupied by the PSSCH DMRS in a plurality of DMRS configurations, instead of an actual number of REs occupied by the PSSCH DMRS in one transmission. Therefore, for initial transmission and retransmission, the number of REs for data transmission remains unchanged, where the number of REs is determined based on the second overhead of the PSSCH DMRS, and the TBS determined based on the number of REs for data transmission is the same, so that transport blocks for initial transmission and retransmission in a sidelink communication process can be combined, to achieve a combined gain. In addition, in this solution, the TBS is determined based on the number of REs for data transmission, where the number of REs is determined based on the average number of REs occupied by the PSSCH DMRS in the plurality of DMRS configurations on the first time-frequency resource. Therefore, the PSSCH may be allowed to carry different quantities of DMRS symbols in initial transmission and retransmission processes of one TBS. In this way, it can be ensured that when a channel state changes in initial transmission and retransmission processes of one transport block, the channel estimation accuracy can be improved and the transmission reliability can be ensured by increasing the number of DMRS symbols. In addition, when the channel state is good, the throughput of the PSSCH may be increased by reducing the number of DMRS symbols.

In an example implementation of the third aspect, the overhead is the average number of occupied REs. The first overhead of the PSSCH DMRS on the first time-frequency resource may be an average number of REs occupied by the PSSCH DMRS on the first time-frequency resource in each DMRS configuration. The second overhead of the PSSCH DMRS may be the average number of REs occupied by the PSSCH DMRS on the first time-frequency resource, and may be specifically an average value of first overheads of the PSSCH DMRS in the plurality of DMRS configurations.

In an example implementation of the third aspect, the second overhead of the PSSCH DMRS satisfies the following formula:

$$N_{DMRS} = \frac{1}{N}\sum_{n=0}^{N-1} N_n^{DMRS},$$

where $N_{DMRS}$ represents the second overhead of the PSSCH DMRS on the first time-frequency resource, N represents the number of DMRS configurations in the DMRS configuration set corresponding to the first time-frequency resource, and $N_n^{DMRS}$ represents a first overhead of the PSSCH DMRS on the first time-frequency resource in an $n^{th}$ DMRS configuration.

In the foregoing example implementation, the second overhead of the PSSCH DMRS is determined based on the first overhead of the PSCCH DMRS in each DMRS configuration in the DMRS configuration set. Therefore, the PSSCH may be allowed to carry different quantities of DMRS symbols in initial transmission and retransmission processes of one TBS. In this way, it can be ensured that when a channel state changes in initial transmission and retransmission processes of one transport block, the channel estimation accuracy can be improved and the transmission reliability can be ensured by increasing the number of DMRS symbols. In addition, when the channel state is good, the throughput of the PSSCH may be increased by reducing the number of DMRS symbols.

In an example implementation of the third aspect, the method further includes: determining the first overhead of the PSSCH DMRS on the first time-frequency resource in the $n^{th}$ DMRS configuration based on a number of DMRS symbols in the $n^{th}$ DMRS configuration in the DMRS configuration set and a DMRS frequency domain density. The DMRS configuration set corresponding to the first time-frequency resource may be configured by a network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS. In the foregoing example implementation, the first overhead of the PSSCH DMRS is determined based on the number of DMRS symbols in each DMRS configuration in the DMRS configuration set. Therefore, the PSSCH may be allowed to carry different quantities of DMRS symbols in initial transmission and retransmission processes of one TBS. In this case, different quantities of DMRS symbols are set, so that when a channel state is poor or an SINR decreases, the PSSCH decoding efficiency can be improved by increasing the number of DMRS symbols, or when the channel state is good or the SINR increases, the channel throughput of the PSSCH is improved by deceasing the number of DMRS symbols.

In an example implementation of the third aspect, when the PSSCH DMRS and a sidelink control channel PSCCH do not overlap in time domain, the first overhead number of the PSSCH DMRS on the first time-frequency resource in the $n^{th}$ DMRS configuration satisfies the following formula:

$$N_n^{DMRS} = N_{SC}^{PRB} \times k_n \times \frac{M_{PSSCH}^{PRB}}{P};$$

or when the PSSCH DMRS and the PSCCH overlap in time domain, the first overhead of the PSSCH DMRS on the first time-frequency resource in the $n^{th}$ DMRS configuration satisfies the following formula:

$$N_n^{DMRS} = N_{SC}^{PRB} \times k_n \times \frac{M_{PSSCH}^{PRB}}{P} - N_{SC}^{PRB} \times \frac{M_{PSSCH}^{PRB}}{P},$$

where $N_n^{DMRS}$ represents the first overhead of the PSSCH DMRS on the first time-frequency resource in the $n^{th}$ DMRS configuration, $N_{SC}^{PRB}$ represents a number of subcarriers in one PRB, $k_n$ represents the number of DMRS symbols in the $n^{th}$ DMRS configuration, $M_{PSCCH}^{PRB}$ represents a number of PRBs included in the PSSCH, and P represents the DMRS frequency domain density, where P is a positive integer.

In the foregoing example implementation, regardless of whether the PSSCH DMRS and the PSCCH overlap in time domain or do not overlap in time domain, the number of REs on the first time-frequency resource that are for data transmission can be accurately determined, and the TBS of a transport block is determined, to achieve a combined gain of a plurality of transmissions of the same transport block. In addition, whether the PSSCH DMRS and the PSCCH overlap in time domain is distinguished, so that the first overhead of the PSSCH DMRS can be further accurately determined. In this case, a preset PSSCH transmission code rate is implemented, and a resource waste caused by an excessively low transmission code rate is reduced or transmission unreliability caused by an excessively high code rate is eliminated.

In an example implementation of the third aspect, the number of REs on the first time-frequency resource that are for data transmission is further related to at least one of the following: a number of subcarriers in one physical resource block PRB, a number of reference symbols for the PSSCH in the first time unit, an overhead of a phase tracking reference signal PTRS and/or an overhead of a channel state information reference signal CSI-RS in one PRB, a number of PRBs included in the PSSCH, an overhead of first control information on the first time-frequency resource, and an overhead of second control information on the first time-frequency resource. In the foregoing example implementation, the plurality of different parameters are considered, so that the number of REs on the first time-frequency resource that are for data transmission can be determined more accurately.

In an example implementation of the third aspect, the number of REs on the first time-frequency resource that are for data transmission satisfies the following formula:

$$N_{RE} = N_{SC}^{PRB} \times N_{sym}^{sh'} \times M_{PSSCH}^{PRB} - N_{DMRS} - x \times M_{PSSCH}^{PRB} - N_{SCI1} - N_{SCI2},$$

where $N_{RE}$ represents the number of REs on the first time-frequency resource that are for data transmission, $N_{SC}^{PRB}$ represents the number of subcarriers in one PRB, $N_{sym}^{sh'}$ represents the number of reference symbols for the PSSCH in the first time unit, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource.

In an example implementation of the third aspect, the number of REs on the first time-frequency resource that are for data transmission satisfies the following formula:

$$\overline{N_{RE}} = \min(Q \times M_{PSSCH}^{PRB}, N_{RE}),$$

where Q represents an upper limit of a number of REs in one PRB that are for determining the TBS.

In the foregoing two example implementations, overheads of different information on the first time-frequency resource are considered, so that the number of REs on the first time-frequency resource that are for data transmission can be determined more accurately.

Optionally, when the method is applied to the transmit end, the method may further include: determining the transport block size based on the determined number of REs for data transmission; and sending a transport block. When the method is applied to the receive end, the method may further include: determining the transport block size based on the determined number of REs for data transmission; and receiving a transport block.

According to a fourth aspect, an apparatus for determining a transport block size is provided. The apparatus may be applied to a V2X transmit end, or may be applied to a V2X receive end. The apparatus includes: a processing unit, configured to determine, based on a number of DMRS configurations in a demodulation reference signal DMRS configuration set corresponding to a first time-frequency resource and a first overhead of a sidelink data channel PSSCH demodulation reference signal DMRS on the first time-frequency resource in each DMRS configuration in the DMRS configuration set, a second overhead of the PSSCH DMRS on the first time-frequency resource, where the first time-frequency resource includes a first time unit in time domain. The processing unit is further configured to determine, based on the second overhead of the PSSCH DMRS, a number of REs on the first time-frequency resource that are for data transmission. The number of REs on the first time-frequency resource that are for data transmission may also be replaced with a number of available REs on the first time-frequency resource or a number of REs on the first time-frequency resource that are allocated for a PSSCH. The number of REs for data transmission is for determining a transport block size TBS of the PSSCH.

In an example implementation of the fourth aspect, the overhead is an average number of occupied REs. The first overhead of the PSSCH DMRS on the first time-frequency resource may be an average number of REs occupied by the PSSCH DMRS on the first time-frequency resource in each DMRS configuration. The second overhead of the PSSCH DMRS may be the average number of REs occupied by the PSSCH DMRS on the first time-frequency resource, and may be specifically an average value of first overheads of the PSSCH DMRS in the plurality of DMRS configurations.

In an example implementation of the fourth aspect, the second overhead of the PSSCH DMRS satisfies the following formula:

$$N_{DMRS} = \frac{1}{N} \sum_{n=0}^{N-1} N_n^{DMRS},$$

where $N_{DMRS}$ represents the second overhead of the PSSCH DMRS on the first time-frequency resource, N represents the number of DMRS configurations in the DMRS configuration set corresponding to the first time-frequency resource, and $N_n^{DMRS}$ represents a first overhead of the PSSCH DMRS on the first time-frequency resource in an $n^{th}$ DMRS configuration.

In an example implementation of the fourth aspect, the method further includes: determining the first overhead of the PSSCH DMRS on the first time-frequency resource in the $n^{th}$ DMRS configuration based on a number of DMRS symbols in the $n^{th}$ DMRS configuration in the DMRS configuration set and a DMRS frequency domain density. The DMRS configuration set corresponding to the first time-frequency resource may be configured by a network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS.

In an example implementation of the fourth aspect, when the PSSCH DMRS and a sidelink control channel PSCCH do not overlap in time domain, the first overhead number of the PSSCH DMRS on the first time-frequency resource in the $n^{th}$ DMRS configuration satisfies the following formula:

$$N_n^{DMRS} = N_{SC}^{PRB} \times k_n \times \frac{M_{PSSCH}^{PRB}}{P},$$

when the PSSCH DMRS and the PSCCH overlap in time domain, the first overhead of the PSSCH DMRS on the first time-frequency resource in the $n^{th}$ DMRS configuration satisfies the following formula:

$$N_n^{DMRS} = N_{SC}^{PRB} \times k_n \times \frac{M_{PSSCH}^{PRB}}{P} - N_{SC}^{PRB} \times \frac{M_{PSCCH}^{PRB}}{P},$$

where $N_n^{DMRS}$ represents the first overhead of the PSSCH DMRS on the first time-frequency resource in the $n^{th}$ DMRS configuration, $N_{SC}^{PRB}$ represents a number of subcarriers in one PRB, $k_n$ represents the number of DMRS symbols in the $n^{th}$ DMRS configuration, $M_{PSCCH}^{PRB}$ represents a number of PRBs included in the PSSCH, and P represents the DMRS frequency domain density, where P is a positive integer.

In an example implementation of the fourth aspect, the number of REs on the first time-frequency resource that are for data transmission is further related to at least one of the following: a number of subcarriers in one physical resource block PRB, a number of reference symbols for the PSSCH in the first time unit, an overhead of a phase tracking reference signal PTRS and/or an overhead of a channel state information reference signal CSI-RS in one PRB, a number of PRBs included in the PSSCH, an overhead of first control information on the first time-frequency resource, and an overhead of second control information on the first time-frequency resource.

In an example implementation of the fourth aspect, the number of REs on the first time-frequency resource that are for data transmission satisfies the following formula:

$$N_{RE}=N_{SC}^{PRB} \times N_{sym}^{sh'} \times M_{PSSCH}^{PRB} - N_{DMRS} - x \times M_{PSSCH}^{PRB} - N_{SCI1} - N_{SCI2},$$

where $N_{RE}$ represents the number of REs on the first time-frequency resource that are for data transmission, $N_{SC}^{PRB}$ represents the number of subcarriers in one PRB, $N_{sym}^{sh'}$ represents the number of reference symbols for the PSSCH in the first time unit, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource.

In an example implementation of the fourth aspect, the number of REs on the first time-frequency resource that are for data transmission satisfies the following formula:

$$\overline{N_{RE}}=\min(Q \times M_{PSSCH}^{PRB}, N_{RE}),$$

where Q represents an upper limit of a number of REs in one PRB that are for determining a TBS.

Optionally, when the apparatus is applied to the transmit end, the apparatus further includes a sending unit. The processing unit is further configured to determine the transport block size based on the determined number of REs for data transmission; and the sending unit is configured to send a transport block. Optionally, when the apparatus is applied to the receive end, the apparatus further includes a receiving unit. The processing unit is further configured to determine the transport block size based on the determined number of REs for data transmission; and the receiving unit is configured to receive a transport block.

According to a fifth aspect, a method for determining a transport block size is provided. The method may be applied to a first terminal device, and the first terminal device may be a V2X transmit end. The method includes: The first terminal device sends first indication information and/or second indication information to a second terminal device, where the first indication information indicates a scaling factor of second control information, the second indication information indicates an overhead of a sidelink data channel PSSCH demodulation reference signal DMRS, and the scaling factor of the second control information indicated by the first indication information may be used to determine an overhead of the second control information on the first time-frequency resource. The first terminal device determines a transport block size TBS of a sidelink data channel PSSCH based on the scaling factor of the second control information and/or the overhead of the PSSCH DMRS.

In the foregoing technical solution, when the overhead of the PSSCH DMRS determined in different manners exists, or there are a plurality of configurations of the scaling factor of the second control information, various configurations can be flexibly used in initial transmission and retransmission processes of the PSSCH, and a user may freely select the overhead of the PSSCH DMRS, so that the user can comprehensively consider a channel state of a PSSCH link, different DMRS configurations configured in a resource pool, and the scaling factor of the second control information, thereby improving the decoding reliability. In addition, according to the method, when the transmit end and a receive end determine the TBS, it can be ensured that the determined overhead of the second control information and/or the overhead of the PSSCH DMRS are/is the same. Therefore, it can be ensured that TBSs determined by the transmit end and the receive end are consistent, and transport blocks for initial transmission and retransmission in a sidelink communication process can be combined, to achieve a combined gain.

In an example implementation of the fifth aspect, the overhead may be an average number of occupied REs. The overhead of the PSSCH DMRS may be an average number of REs occupied by the PSSCH DMRS on the first time-frequency resource, and the first time-frequency resource includes the first time unit in time domain. The overhead of the second control information may be an average number of REs occupied by the second control information on the first time-frequency resource.

In an example implementation of the fifth aspect, the first indication information is one bit. In the foregoing example implementation, a number of bits occupied by the first indication information can be reduced.

In an example implementation of the fifth aspect, the scaling factor of the second control information is equal to a scaling factor β carried in the first control information, or the scaling factor of the second control information is equal to an average value $\bar{β}$ of at least one configured scaling factor. In the foregoing example implementation, the second indication information may implicitly indicate different scaling factors of the second control information, so that the indication flexibility and the diversity of the second indication information are improved.

In an example implementation of the fifth aspect, the first indication information is the scaling factor β' of the second control information. Optionally, β' is a positive integer, and β' is any scaling factor in a configured scaling factor set corresponding to the second control information, or β' is greater than or equal to a smallest value in the scaling factor set and less than or equal to a largest value in the scaling factor set. In the foregoing example implementation, the second indication information may explicitly indicate the scaling factor of the second control information. For example, the second indication information may be specifically an index value of the scaling factor of the second control information. In the foregoing example implementation, a simple and effective indication manner of the first indication information is provided.

In an example implementation of the fifth aspect, the second indication information is one bit. In the foregoing example implementation, a number of bits occupied by the second indication information can be reduced.

In an example implementation of the fifth aspect, that the second indication information indicates an overhead of a PSSCH DMRS includes: The second indication information indicates the overhead of the PSSCH DMRS that is determined based on a number of DMRS symbols carried in the first control information; or the second indication information indicates the overhead of the PSSCH DMRS that is determined based on an average number of REs occupied by the PSSCH DMRS in at least one DMRS configuration. In the foregoing example implementation, transport blocks for initial transmission and retransmission in a sidelink communication process can be combined, to achieve a combined gain. In addition, in this solution, the TBS is determined based on the number of REs for data transmission, where the number of REs is determined based on the overhead of the PSSCH DMRS. Therefore, the PSSCH may be allowed to carry different quantities of DMRS symbols in initial transmission and retransmission processes of one TBS. In this way, it can be ensured that when a channel state changes in initial transmission and retransmission processes of one transport block, the channel estimation accuracy can be improved and the transmission reliability can be ensured by increasing the number of DMRS symbols. In addition, when the channel state is good, the throughput of the PSSCH may be increased by reducing the number of DMRS symbols.

In an example implementation of the fifth aspect, the method may further include: The first terminal device determines the transport block size based on the determined number of REs for data transmission; and the first terminal device sends the transport block.

According to a sixth aspect, a method for determining a transport block size is provided. The method may be applied to a second terminal device, and the second terminal device may be a V2X receive end. The method includes: The second terminal device receives first indication information and/or second indication information from a first terminal device, where the first indication information indicates a scaling factor of second control information, and the second indication information indicates an overhead of a sidelink data channel PSSCH demodulation reference signal DMRS. The second terminal device determines a transport block size TBS of a sidelink data channel PSSCH based on the scaling factor of the second control information and/or the overhead of the PSSCH DMRS.

In the foregoing technical solution, when the overhead of the PSSCH DMRS determined in different manners exists, or there are a plurality of configurations of the scaling factor of the second control information, various configurations can be flexibly used in initial transmission and retransmission processes of the PSSCH, and a user may freely select the overhead of the PSSCH DMRS, so that the user can comprehensively consider a channel state of a PSSCH link, different DMRS configurations configured in a resource pool, and the scaling factor of the second control information, thereby improving the decoding reliability. In addition, according to the method, when the transmit end and a receive end determine the TBS, it can be ensured that the determined overhead of the second control information and/or the overhead of the PSSCH DMRS are/is the same. Therefore, it can be ensured that TBSs determined by the transmit end and the receive end are consistent, and transport blocks for initial transmission and retransmission in a sidelink communication process can be combined, to achieve a combined gain.

In an example implementation of the sixth aspect, the overhead may be an average number of occupied REs. The overhead of the PSSCH DMRS may be an average number of REs occupied by the PSSCH DMRS on the first time-frequency resource, and the first time-frequency resource includes the first time unit in time domain. The overhead of the second control information may be an average number of REs occupied by the second control information on the first time-frequency resource.

In an example implementation of the sixth aspect, the first indication information is one bit. In the foregoing example implementation, a number of bits occupied by the first indication information can be reduced.

In an example implementation of the sixth aspect, the scaling factor of the second control information is equal to a scaling factor $\beta$ carried in the first control information, or the scaling factor of the second control information is equal to an average value $\bar{\beta}$ of at least one configured scaling factor. In the foregoing example implementation, the second indication information may implicitly indicate different scaling factors of the second control information, so that the indication flexibility and the diversity of the second indication information are improved.

In an example implementation of the sixth aspect, the first indication information is the scaling factor $\beta'$ of the second control information. Optionally, $\beta'$ is a positive integer, and $\beta'$ is any scaling factor in a configured scaling factor set corresponding to the second control information, or $\beta'$ is greater than or equal to a smallest value in the scaling factor set and less than or equal to a largest value in the scaling factor set. In the foregoing example implementation, the second indication information may explicitly indicate the scaling factor of the second control information. For example, the second indication information may be specifically an index value of the scaling factor of the second control information. In the foregoing example implementation, a simple and effective indication manner of the first indication information is provided.

In an example implementation of the sixth aspect, the second indication information is one bit. In the foregoing example implementation, a number of bits occupied by the second indication information can be reduced.

In an example implementation of the sixth aspect, that the second indication information indicates an overhead of a PSSCH DMRS includes: The second indication information indicates the overhead of the PSSCH DMRS that is determined based on a number of DMRS symbols carried in the first control information; or the second indication information indicates the overhead of the PSSCH DMRS that is determined based on an average number of REs occupied by the PSSCH DMRS in at least one DMRS configuration. In the foregoing example implementation, transport blocks for initial transmission and retransmission in a sidelink communication process can be combined, to achieve a combined gain. In addition, in this solution, the TBS is determined based on the number of REs for data transmission, where the number of REs is determined based on the overhead of PSSCH DMRS. Therefore, the PSSCH may be allowed to carry different quantities of DMRS symbols in initial transmission and retransmission processes of one TBS. In this way, it can be ensured that when a channel state changes in initial transmission and retransmission processes of one transport block, the channel estimation accuracy can be improved and the transmission reliability can be ensured by increasing the number of DMRS symbols. In addition, when the channel state is good, the throughput of the PSSCH may be increased by reducing the number of DMRS symbols.

In an example implementation of the sixth aspect, the method may further include: The second terminal device determines the transport block size based on the determined number of REs for data transmission; and the second terminal device receives the transport block.

According to a seventh aspect, an apparatus for determining a transport block size is provided. The apparatus may be applied to a first terminal device, and the first terminal device may be a V2X transmit end. The apparatus includes: a sending unit, configured to send first indication information and/or second indication information to a second terminal device, where the first indication information indicates a scaling factor of second control information, and the second indication information indicates an overhead of a sidelink data channel PSSCH demodulation reference signal DMRS; and a processing unit, configured to determine a transport block size TBS of a sidelink data channel PSSCH based on the scaling factor of the second control information and/or the overhead of the PSSCH DMRS.

In an example implementation of the seventh aspect, the overhead may be an average number of occupied REs. The overhead of the PSSCH DMRS may be an average number of REs occupied by the PSSCH DMRS on the first time-frequency resource, and the first time-frequency resource includes the first time unit in time domain. The overhead of the second control information may be an average number of REs occupied by the second control information on the first time-frequency resource.

In an example implementation of the seventh aspect, the first indication information is one bit.

In an example implementation of the seventh aspect, the scaling factor of the second control information is equal to a scaling factor $\beta$ carried in the first control information, or the scaling factor of the second control information is equal to an average value $\bar{\beta}$ of at least one configured scaling factor.

In an example implementation of the seventh aspect, the first indication information is the scaling factor, $\beta'$ of the second control information. Optionally, $\beta'$ is a positive integer, and $\beta'$ is any scaling factor in a configured scaling factor set corresponding to the second control information, or $\beta'$ is greater than or equal to a smallest value in the scaling factor set and less than or equal to a largest value in the scaling factor set.

In an example implementation of the seventh aspect, the second indication information is one bit.

In an example implementation of the seventh aspect, that the second indication information indicates an overhead of a PSSCH DMRS includes: The second indication information indicates the overhead of the PSSCH DMRS that is determined based on a number of DMRS symbols carried in the first control information; or the second indication information indicates the overhead of the PSSCH DMRS that is determined based on an average number of REs occupied by the PSSCH DMRS in at least one DMRS configuration.

In an example implementation of the seventh aspect, the processing unit is further configured to determine the transport block size based on the determined number of REs for data transmission; and the sending unit is further configured to send a transport block.

According to an eighth aspect, an apparatus for determining a transport block size is provided. The apparatus may be applied to a second terminal device, and the second terminal device may be a V2X receive end. The apparatus includes: a receiving unit, configured to receive first indication information and/or second indication information from a first terminal device, where the first indication information indicates a scaling factor of second control information, and the second indication information indicates an overhead of a sidelink data channel PSSCH demodulation reference signal DMRS; and a processing unit, configured to determine a transport block size TBS of a sidelink data channel PSSCH based on the scaling factor of the second control information and/or the overhead of the PSSCH DMRS.

In an example implementation of the eighth aspect, the overhead may be an average number of occupied REs. The overhead of the PSSCH DMRS may be an average number of REs occupied by the PSSCH DMRS on the first time-frequency resource, and the first time-frequency resource includes the first time unit in time domain. The overhead of the second control information may be an average number of REs occupied by the second control information on the first time-frequency resource.

In an example implementation of the eighth aspect, the first indication information is one bit.

In an example implementation of the eighth aspect, the scaling factor of the second control information is equal to a scaling factor $\beta$ carried in the first control information, or the scaling factor of the second control information is equal to an average value $\bar{\beta}$ of at least one configured scaling factor.

In an example implementation of the eighth aspect, the first indication information is the scaling factor $\beta'$ of the second control information. Optionally, $\beta'$ is a positive integer, and $\beta'$ is any scaling factor in a configured scaling factor set corresponding to the second control information, or $\beta'$ is greater than or equal to a smallest value in the scaling factor set and less than or equal to a largest value in the scaling factor set.

In an example implementation of the eighth aspect, the second indication information is one bit.

In an example implementation of the eighth aspect, that the second indication information indicates an overhead of a PSSCH DMRS includes: The second indication information indicates the overhead of the PSSCH DMRS that is determined based on a number of DMRS symbols carried in the first control information; or the second indication information indicates the overhead of the PSSCH DMRS that is determined based on an average number of REs occupied by the PSSCH DMRS in at least one DMRS configuration.

In an example implementation of the eighth aspect, the processing unit is further configured to determine the transport block size based on the determined number of REs for data transmission; and the receiving unit is further configured to receive a transport block.

According to a ninth aspect, a method for determining a sidelink data channel demodulation reference signal symbol is provided. The method may be applied to a V2X transmit end, or may be applied to a V2X receive end. The method includes: determining, based on a number of DMRS symbols for a sidelink data channel PSSCH demodulation reference signal DMRS on a first time-frequency resource and a number of reference symbols for a sidelink data channel PSSCH, a symbol mapping position of the PSSCH DMRS on the first time-frequency resource. The first time-frequency resource includes a first time unit in time domain, and may include one subchannel or a plurality of continuous subchannels in frequency domain. The PSSCH and the PSSCH DMRS may occupy the one subchannel or the plurality of continuous subchannels. The PSCCH may occupy a plurality of continuous PRBs in one subchannel.

In the foregoing technical solution, for initial transmission or retransmission of data, both the transmit end and the receive end may determine the symbol mapping position of the PSSCH DMRS on the first time-frequency resource based on the number of DMRS symbols for the PSSCH DMRS on the first time-frequency resource and the number of reference symbols for the PSSCH, so that the transmit end and the receive end can quickly and efficiently determine the symbol mapping position of the PSSCH DMRS. In addition, because a number of PSFCH symbols and a number of PSCCH symbols are fixedly configured in a resource pool and are information known to both a transmit end user and a receive end user, the number of reference symbols for the PSSCH defined in this solution is determined by excluding a number of symbols occupied by a PSFCH from a number of symbols in the first time unit, excluding an AGC symbol and the last GAP symbol in the first time unit, and excluding a number of PRBs included in a PSCCH based on a relationship between a number of PRBs included in the PSSCH and the number of PRBs included in the PSCCH. In this way, in one aspect, it can be ensured that an existing PSSCH DMRS configuration can work when the PSSCH and the PSCCH have a same bandwidth, and in another aspect, it is ensured that a use scenario of a number of symbols included in the PSS CH DMRS configuration is not affected by the presence of the PSFCH.

In an example implementation of the ninth aspect, the number of reference symbols is determined based on at least one of the following: a symbol overhead of a sidelink control channel excluded from the first time unit, a symbol overhead of a sidelink feedback channel excluded from the first time unit, an automatic gain control AGC symbol excluded from the first time unit, and the last GAP symbol excluded from the first time unit. In the foregoing example implementation, the number of reference symbols is determined by considering different symbol overheads, so that the accuracy of determining the number of reference symbols can be improved.

In an example implementation of the ninth aspect, the number of reference symbols is determined by first configuration information, and the first configuration information includes at least one of the following: the number of symbols in the first time unit, feedback configuration periodicity information of a sidelink feedback channel, a number of symbols included in the sidelink feedback channel and a guard interval of the sidelink feedback channel, and the relationship between the number of physical resource blocks PRBs included in the PSSCH and the number of PRBs included in the sidelink control channel. In the foregoing example implementation, a simple and effective manner for determining the number of reference symbols is provided.

In an example implementation of the ninth aspect, when the number of PRBs included in the PSSCH is not equal to the number of PRBs included in the sidelink control channel, the number of reference symbols satisfies the following formula:

$$N_{sym}^{sh'}=N_{sym}^{sh}-N_{sym}^{PSFCH},$$

where $N_{sym}^{sh'}$ represents the number of reference symbols, $N_{sym}^{sh}$ represents a number of last GAP symbols and/or automatic gain control AGC symbols excluded from the first time unit, and $N_{sym}^{PSFCH}$ represents the symbol overhead of the sidelink feedback channel. The AGC symbol is the first Y symbols in the first time unit, where Y is a natural number, for example, 1, 2, or 3.

In the foregoing example implementation, the number of reference symbols can be accurately determined when the number of PRBs included in the PSSCH is not equal to the number of PRBs included in the sidelink control channel.

In an example implementation of the ninth aspect, a symbol mapping position of the PSSCH DMRS in a slot is $l_{sym}^{start}+\bar{l}$, where $l_{sym}^{start}$ represents a start symbol position of the first time unit, and $\bar{l}$ represents a relative position of a DMRS symbol for the PSSCH DMRS in the first time unit. In the foregoing example implementation, the symbol mapping position of the PSSCH DMRS in a slot may be the start symbol position of the first time unit or the relative position of the DMRS symbol for the PSSCH DMRS in the first time unit. In this case, the symbol mapping position of the PSSCH DMRS in a slot can start from the first symbol position, so that the decoding efficiency is greatly improved.

In an example implementation of the ninth aspect, when the number of PRBs included in the PSSCH is equal to the number of PRBs included in the sidelink control channel, the number of reference symbols satisfies the following formula:

$$N_{sym}^{sh'}=N_{sym}^{sh}-N_{sym}^{PSFCH}-N_{sym}^{PSCCH},$$

where $N_{sym}^{sh'}$ represents the number of reference symbols $N_{sym}^{sh}$ represents the number of last GAP symbols and/or automatic gain control AGC symbols excluded from the first time unit, $N_{sym}^{PSFCH}$ represents the symbol overhead of the sidelink feedback channel, and $N_{sym}^{PSCCH}$ represents the symbol overhead of the sidelink feedback channel. The AGC symbol is the first Y symbols in the first time unit, where Y is a natural number, for example, 1, 2, or 3.

In the foregoing example implementation, the number of reference symbols can be accurately determined when the number of PRBs included in the PSSCH is equal to the number of PRBs included in the sidelink control channel.

In an example implementation of the ninth aspect, a symbol mapping position of the PSSCH DMRS in a slot is $l_{sym}^{start}+N_{sym}^{PSCCH}+\bar{l}$, where $l_{sym}^{start}$ represents a start symbol position of the first time unit, $\bar{l}$ represents a relative position of a DMRS symbol for the PSSCH DMRS in the first time unit, and $N_{sym}^{PSCCH}$ represents a symbol overhead of the sidelink control channel. In the foregoing example implementation, the symbol mapping position of the PSSCH DMRS in a slot may be the start symbol position of the first time unit or the relative position of the DMRS symbol for the PSSCH DMRS in the first time unit. In this case, the symbol mapping position of the PSSCH DMRS in a slot can start from the first symbol position, so that the decoding efficiency is greatly improved.

In an example implementation of the ninth aspect, the symbol overhead of the sidelink feedback channel is related to feedback configuration periodicity information of the sidelink feedback channel. Optionally, for the symbol overhead of the PSFCH, if a feedback configuration period of the PSFCH is represented as W, and a number of symbols included in the PSFCH and a guard interval of the PSFCH is represented as Z, the symbol overhead $N_{sym}^{PSFCH}$ of the PSFCH satisfies the following conditions: When W is not 0, $N_{sym}^{PSFCH}=Z/W$ and Z=3, or $N_{sym}^{PSFCH}=\lceil Z/W \rceil$, where $\lceil\ \rceil$ represents rounding up; or when W is 0, $N_{sym}^{PSFCH}=0$. In the foregoing example implementation, a simple and effective manner for determining the symbol overhead of the SFCH is provided.

In an example implementation of the ninth aspect, when the symbol mapping position of the PSSCH DMRS exceeds the symbols included in the PSSCH, the PSSCH DMRS is not mapped to the exceeded symbol mapping position. For example, if symbol mapping positions of the PSSCH DMRS are respectively sym1, sym4, sym7, and sym10, and symbols included in the PSSCH are sym1 to sym9, sym10 exceeds the symbols included in the PSSCH, so that the PSSCH DMRS is not mapped to sym10.

In an example implementation of the ninth aspect, the symbol mapping position of the PSSCH DMRS on the first time-frequency resource is further related to the symbol overhead of the sidelink control channel. Optionally, the symbol overhead of the PSCCH is 2, that is, the PSCCH occupies two symbols in the first time unit; or the symbol overhead of the PSCCH is 3, that is, the PSCCH occupies three symbols in the first time unit.

According to a tenth aspect, an apparatus for determining a sidelink data channel demodulation reference signal symbol is provided. The apparatus may be applied to a V2X transmit end or a V2X receive end. The apparatus includes:

a processing unit, configured to determine, based on a number of DMRS symbols for a sidelink data channel PSSCH demodulation reference signal DMRS on a first time-frequency resource and a number of reference symbols for a sidelink data channel PSSCH, a symbol mapping position of the PSSCH DMRS on the first time-frequency resource. The first time-frequency resource includes a first time unit in time domain, and may include one subchannel or a plurality of continuous subchannels in frequency domain. The PSSCH and the PSSCH DMRS may occupy the one subchannel or the plurality of continuous subchannels. The PSCCH may occupy a plurality of continuous PRBs in one subchannel.

In an example implementation of the tenth aspect, the number of reference symbols is determined based on at least one of the following: a symbol overhead of a sidelink control channel excluded from the first time unit, a symbol overhead of a sidelink feedback channel excluded from the first time unit, an automatic gain control AGC symbol excluded from the first time unit, and the last GAP symbol excluded from the first time unit.

In an example implementation of the tenth aspect, the number of reference symbols is determined by first configuration information, and the first configuration information includes at least one of the following: the number of symbols in the first time unit, feedback configuration periodicity information of a sidelink feedback channel, a number of symbols included in the sidelink feedback channel and a guard interval of the sidelink feedback channel, and the relationship between the number of physical resource blocks PRBs included in the PSSCH and the number of PRBs included in the sidelink control channel.

In an example implementation of the tenth aspect, when the number of PRBs included in the PSSCH is not equal to the number of PRBs included in the sidelink control channel, the number of reference symbols satisfies the following formula:

$$N_{sym}^{sh'}=N_{sym}^{sh}-N_{sym}^{PSFCH},$$

where $N_{sym}^{sh'}$ represents the number of reference symbols, $N_{sym}^{sh}$ represents a number of last GAP symbols and/or automatic gain control AGC symbols excluded from the first time unit, and $N_{sym}^{PSFCH}$ represents the symbol overhead of the sidelink feedback channel. The AGC symbol is the first Y symbols in the first time unit, where Y is a natural number, for example, 1, 2, or 3.

In an example implementation of the tenth aspect, a symbol mapping position of the PSSCH DMRS in a slot is $l_{sym}^{start}+\bar{I}$, where $l_{sym}^{start}$ represents a start symbol position of the first time unit, and $\bar{I}$ represents a relative position of a DMRS symbol for the PSSCH DMRS in the first time unit.

In an example implementation of the tenth aspect, when the number of PRBs included in the PSSCH is equal to the number of PRBs included in the sidelink control channel, the number of reference symbols satisfies the following formula:

$$N_{sym}^{sh'}=N_{sym}^{sh}-N_{sym}^{PSFCH}-N_{sym}^{PSCCH},$$

where $N_{sym}^{sh'}$ represents the number of reference symbols, $N_{sym}^{sh}$ represents the number of last GAP symbols and/or automatic gain control AGC symbols excluded from the first time unit, $N_{sym}^{PSFCH}$ represents the symbol overhead of the sidelink feedback channel, and $N_{sym}^{PSCCH}$ represents the symbol overhead of the sidelink feedback channel. The AGC symbol is the first Y symbols in the first time unit, where Y is a natural number, for example, 1, 2, or 3.

In an example implementation of the tenth aspect, a symbol mapping position of the PSSCH DMRS in a slot is $l_{sym}^{start}+N_{sym}^{PSCCH}+\bar{I}$, where $l_{sym}^{start}$ represents a start symbol position of the first time unit, $\bar{I}$ represents a relative position of a DMRS symbol for the PSSCH DMRS in the first time unit, and $N_{sym}^{PSCCH}$ represents a symbol overhead of the sidelink control channel.

In an example implementation of the tenth aspect, the symbol overhead of the sidelink feedback channel is related to feedback configuration periodicity information of the sidelink feedback channel. Optionally, for the symbol overhead of the PSFCH, if a feedback configuration period of the PSFCH is represented as W, and a number of symbols included in the PSFCH and a guard interval of the PSFCH is represented as Z, the symbol overhead $N_{sym}^{PSFCH}$ of the PSFCH satisfies the following conditions: When W is not 0, $N_{sym}^{PSFCH}=Z/W$ and Z=3, or $N_{sym}^{PSFCH}=\lceil Z/W \rceil$, where $\lceil \ \rceil$ represents rounding up; or when W is 0, $N_{sym}^{PSFCH}=0$.

In an example implementation of the tenth aspect, when the symbol mapping position of the PSSCH DMRS exceeds the symbols included in the PSSCH, the PSSCH DMRS is not mapped to the exceeded symbol mapping position. For example, if symbol mapping positions of the PSSCH DMRS are respectively sym1, sym4, sym7, and sym10, and symbols included in the PSSCH are sym1 to sym9, sym10 exceeds the symbols included in the PSSCH, so that the PSSCH DMRS is not mapped to sym10.

In an example implementation of the tenth aspect, the symbol mapping position of the PSSCH DMRS on the first time-frequency resource is further related to the symbol overhead of the sidelink control channel. Optionally, the symbol overhead of the PSCCH is 2, that is, the PSCCH occupies two symbols in the first time unit; or the symbol overhead of the PSCCH is 3, that is, the PSCCH occupies three symbols in the first time unit.

According to another aspect of this application, a communication apparatus is provided. The apparatus includes a processor and a memory coupled to the processor. The processor may be configured to execute instructions in the memory, to enable the apparatus to perform the method provided in any one of the first aspect or the example implementations of the first aspect. Optionally, the apparatus further includes a communication interface and a bus, and the processor, the memory, and the communication interface are coupled by using the bus.

According to another aspect of this application, a communication apparatus is provided. The apparatus includes a processor and a memory coupled to the processor. The processor may be configured to execute instructions in the memory, to enable the apparatus to perform the method provided in any one of the third aspect or the example implementations of the third aspect. Optionally, the apparatus further includes a communication interface and a bus, and the processor, the memory, and the communication interface are coupled by using the bus.

According to another aspect of this application, a communication apparatus is provided. The apparatus includes a processor and a memory coupled to the processor. The processor may be configured to execute instructions in the memory, to enable the apparatus to perform the method provided in any one of the fifth aspect or the example implementations of the fifth aspect. Optionally, the apparatus further includes a communication interface and a bus, and the processor, the memory, and the communication interface are coupled by using the bus.

According to another aspect of this application, a communication apparatus is provided. The apparatus includes a processor and a memory coupled to the processor. The processor may be configured to execute instructions in the memory, to enable the apparatus to perform the method provided in any one of the sixth aspect or the example implementations of the sixth aspect. Optionally, the apparatus further includes a communication interface and a bus, and the processor, the memory, and the communication interface are coupled by using the bus.

According to another aspect of this application, a communication apparatus is provided. The apparatus includes a processor and a memory coupled to the processor. The processor may be configured to execute instructions in the memory, to enable the apparatus to perform the method provided in any one of the ninth aspect or the example implementations of the ninth aspect. Optionally, the apparatus further includes a communication interface and a bus, and the processor, the memory, and the communication interface are coupled by using the bus.

According to another aspect of this application, an embodiment of this application provides a communication apparatus. The apparatus includes a processor and an interface circuit. The interface circuit is configured to receive code instructions and transmit the code instructions to the processor. The processor is configured to run the code instructions, to enable the apparatus to perform the method in any one of the first aspect or the example implementations of the first aspect.

According to another aspect of this application, an embodiment of this application provides a communication apparatus. The apparatus includes a processor and an interface circuit. The interface circuit is configured to receive code instructions and transmit the code instructions to the processor. The processor is configured to run the code instructions, to enable the apparatus to perform the method in any one of the second aspect or the example implementations of the second aspect.

According to another aspect of this application, an embodiment of this application provides a communication apparatus. The apparatus includes a processor and an interface circuit. The interface circuit is configured to receive code instructions and transmit the code instructions to the processor. The processor is configured to run the code instructions, to enable the apparatus to perform the method provided in any one of the third aspect or the example implementations of the third aspect.

According to another aspect of this application, an embodiment of this application provides a communication apparatus. The apparatus includes a processor and an interface circuit. The interface circuit is configured to receive code instructions and transmit the code instructions to the processor. The processor is configured to run the code instructions, to enable the apparatus to perform the method provided in any one of the fifth aspect or the example implementations of the fifth aspect.

According to another aspect of this application, an embodiment of this application provides a communication apparatus. The apparatus includes a processor and an interface circuit. The interface circuit is configured to receive code instructions and transmit the code instructions to the processor. The processor is configured to run the code instructions, to enable the apparatus to perform the method provided in any one of the sixth aspect or the example implementations of the sixth aspect.

According to another aspect of this application, an embodiment of this application provides a communication apparatus. The apparatus includes a processor and an interface circuit. The interface circuit is configured to receive code instructions and transmit the code instructions to the processor. The processor is configured to run the code instructions, to enable the apparatus to perform the method provided in any one of the ninth aspect or the example implementations of the ninth aspect.

According to another aspect of this application, a communication system is provided. The communication system includes a network device, a first terminal device, and a second terminal device. The first terminal device is configured to perform the method provided in any one of the first aspect or the example implementations of the first aspect, perform the method provided in any one of the third aspect or the example implementations of the third aspect, perform the method provided in any one of the fifth aspect or the example implementations of the fifth aspect, or perform the method provided in any one of the ninth aspect or the example implementations of the ninth aspect. The second terminal device is configured to perform the method provided in any one of the first aspect or the example implementations of the first aspect, perform the method provided in any one of the third aspect or the example implementations of the third aspect, perform the method provided in any one of the sixth aspect or the example implementations of the sixth aspect, or perform the method provided in any one of the ninth aspect or the example implementations of the ninth aspect.

According to another aspect of this application, a computer program product is provided. The computer program product includes a computer program (which may also be referred to as code or instructions). When the computer program is run, a computer is enabled to perform the method provided in any one of the first aspect or the example implementations of the first aspect.

According to another aspect of this application, a computer program product is provided. The computer program product includes a computer program (which may also be referred to as code or instructions). When the computer program is run, a computer is enabled to perform the method provided in any one of the third aspect or the example implementations of the third aspect.

According to another aspect of this application, a computer program product is provided. The computer program product includes a computer program (which may also be referred to as code or instructions). When the computer program is run, a computer is enabled to perform the method provided in any one of the fifth aspect or the example implementations of the fifth aspect.

According to another aspect of this application, a computer program product is provided. The computer program product includes a computer program (which may also be referred to as code or instructions). When the computer program is run, a computer is enabled to perform the method provided in any one of the sixth aspect or the example implementations of the sixth aspect.

According to another aspect of this application, a computer program product is provided. The computer program product includes a computer program (which may also be referred to as code or instructions). When the computer program is run, a computer is enabled to perform the method provided in any one of the ninth aspect or the example implementations of the ninth aspect.

According to another aspect of this application, a computer-readable storage medium is provided. The computer-readable storage medium stores a computer program (which may also be referred to as code or instructions), and when the computer program runs on a computer, the computer is enabled to perform the method provided in any one of the first aspect or the example implementations of the first aspect.

According to another aspect of this application, a computer-readable storage medium is provided. The computer-readable storage medium stores a computer program (which may also be referred to as code or instructions), and when the computer program runs on a computer, the computer is enabled to perform the method provided in any one of the third aspect or the example implementations of the third aspect.

According to another aspect of this application, a computer-readable storage medium is provided. The computer-readable storage medium stores a computer program (which may also be referred to as code or instructions), and when the computer program runs on a computer, the computer is enabled to perform the method provided in any one of the fifth aspect or the example implementations of the fifth aspect.

According to another aspect of this application, a computer-readable storage medium is provided. The computer-readable storage medium stores a computer program (which may also be referred to as code or instructions), and when the computer program runs on a computer, the computer is enabled to perform the method provided in any one of the sixth aspect or the example implementations of the sixth aspect.

According to another aspect of this application, a computer-readable medium is provided. The computer-readable medium stores a computer program (which may also be referred to as code or instructions), and when the computer program runs on a computer, the computer is enabled to perform the method provided in any one of the ninth aspect or the example implementations of the ninth aspect.

It may be understood that the method for determining a transport block size, the apparatus for determining a sidelink data channel demodulation reference signal symbol, and the computer storage medium or the computer program product provided above are all configured to perform the corresponding methods provided above. Therefore, for beneficial effects that can be achieved by the apparatuses, refer to the beneficial effects in the corresponding methods provided above. Details are not described herein again.

BRIEF DESCRIPTION OF DRAWINGS

FIG. 3 is a schematic diagram of a first time-frequency resource according to an embodiment of this application;

FIG. 6 is a schematic flowchart of another method for determining a transport block size according to an embodiment of this application;

FIG. 7 is a schematic flowchart of another method for determining a transport block size according to an embodiment of this application;

FIG. 9 is a schematic diagram of another first time-frequency resource according to an embodiment of this application;

DESCRIPTION OF EMBODIMENTS

Figure 1:
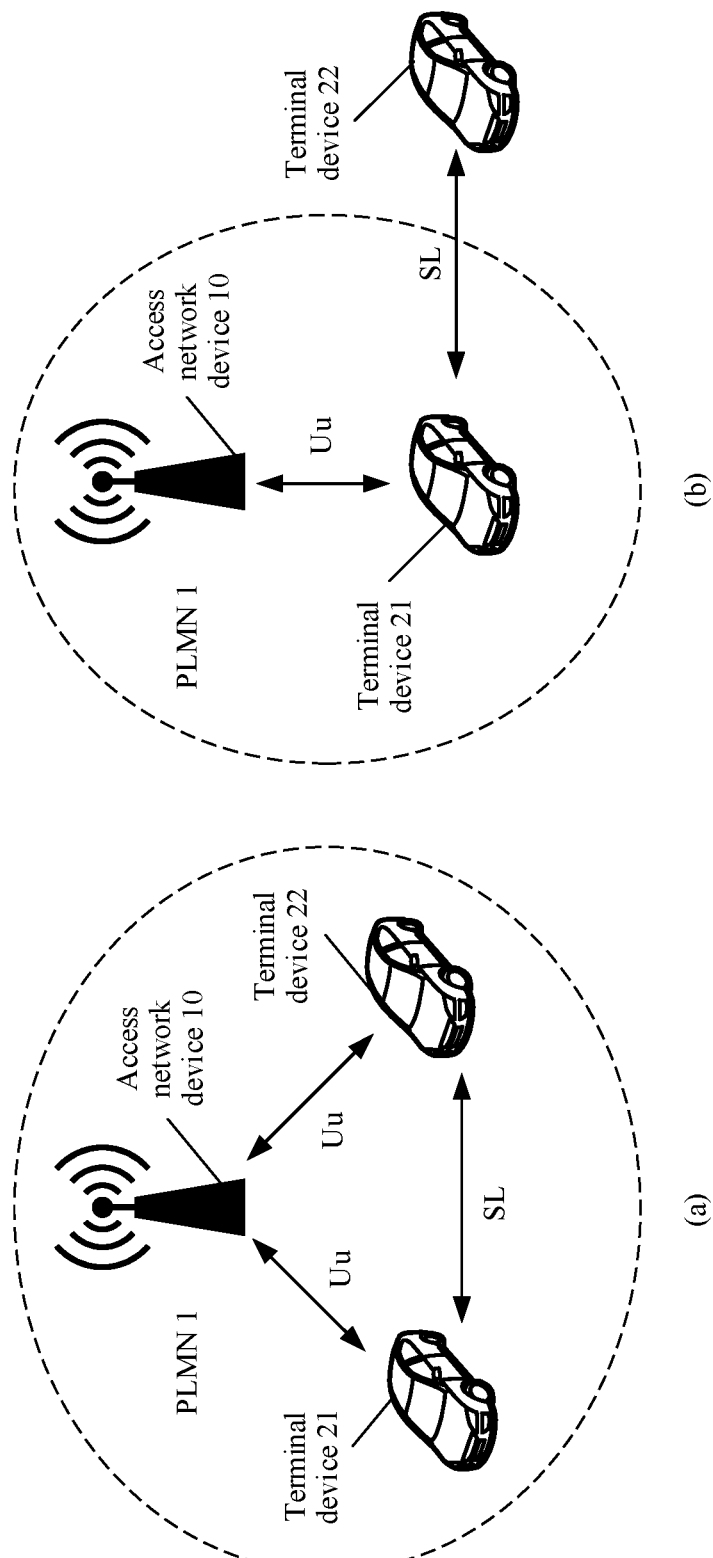
FIG. 1 is a schematic structural diagram of a communication system according to an embodiment of this application.

In this application, at least one means one or more, and a plurality of means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally represents an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, in embodiments of this application, terms such as "first" and "second" are used for distinguishing between same objects or similar objects whose functions and purposes are basically the same. For example, a first threshold and a second threshold are merely used for distinguishing between different thresholds, and a sequence thereof is not limited. A person skilled in the art may understand that the terms such as "first" and "second" do not limit a number or an execution sequence. "*" in the formulas in embodiments of this application represents a multiplication sign.

It should be noted that, in this application, words such as "example" or "for example" are used for representing giving an example, an illustration, or a description. Any embodiment or design solution described by using "example" or "for example" in this application shall not be construed as being more preferred or more advantageous than another embodiment or design solution. Exactly, use of the word "for example" or "example" or the like is intended to present a relative concept in a specific manner.

Technical solutions provided in this application may be used in a device-to-device (D2D) scenario, and optionally, may be used in a vehicle-to-everything (V2X) scenario. For example, the V2X scenario may be specifically any one of the following systems: vehicle-to-vehicle (V2V) communication, vehicle-to-pedestrian (V2P) communication, a vehicle-to-network (V2N) service and vehicle-to-infrastructure (V2I) communication.

For example, D2D may be long term evolution (LTE) D2D or new radio (NR) D2D, or may be D2D in another communication system that may appear as technologies develop. Similarly, V2X may be LTE V2X or NR V2X, or may be V2X in another communication system that may appear as technologies develop.

The service scenario and the communication system described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems. The embodiments of this application are described by using an example in which a provided method is applied to a new radio (NR) system or a 5G network.

FIG. 1 is a schematic structural diagram of a communication system according to an embodiment of this application. Referring to FIG. 1, the communication system includes an access network device 10 and at least two terminal devices 20. The access network device 10 may communicate with the at least two terminal devices 20, and the at least two terminal devices 20 may communicate with each other. In FIG. 1, an example in which the at least two terminal devices 20 include a terminal device 21 and a terminal device 22 is used for description. The terminal device 21 and the terminal device 22 may be two terminal devices in a same public land mobile network (PLMN), or may be two terminal devices in different PLMNs. For example, in (a) in FIG. 1, both the terminal device 21 and the terminal device 22 are in a PLMN 1. In (b) in FIG. 1, the terminal device 21 is in the PLMN 1, and the terminal device 22 is not in the PLMN 1.

Optionally, the communication system shown in FIG. 1 may further include a core network. The access network device 10 may be connected to the core network. The core network may be a 4G core network (for example, an evolved packet core (EPC) network), a 5G core network (5G Core, 5GC), or a core network in various future communication systems.

For example, the core network may be the 4G core network. The access network device 10 may be an evolved NodeB (eNB or eNodeB) in a 4G system. The terminal device 21 may be a terminal device that performs information transmission with the eNB. The eNB accesses the EPC network through an S1 interface.

For example, the core network may be a 5G core network. The access network device 10 may be a next-generation NodeB (gNB) in an NR system, and the terminal device 21 may be a terminal device that performs information transmission with the gNB. The gNB accesses the 5G core network through an NG interface.

Certainly, the access network device 10 may alternatively be a 3rd generation partnership project (3GPP) protocol base station, or may be a non-3GPP protocol base station.

There is a first transmission link between the access network device 10 and the terminal device 21 or the terminal device 22. For example, the first transmission link may be a Uu link, and may be used to transmit a Uu service. There is a second transmission link between the terminal device 21 and the terminal device 22. For example, the second transmission link may be a sidelink (SL), and may be used to transmit a V2X service.

The terminal device 21 and the terminal device 22 may transmit a V2X service to each other on a sidelink, and may also be referred to as sidelink information. The terminal device 21 or the terminal device 22 may transmit an uplink (UL) Uu service to the access network device 10 on the Uu link, or may receive, on the Uu link, a downlink (DL) Uu service sent by the access network device 10.

A direct communication interface between the terminal device 21 and the terminal device 22 may be an interface 1. For example, the interface 1 may be referred to as a PC5 interface, and use an internet of vehicles dedicated frequency band (for example, 5.9 GHz). An interface between the terminal device 21 and the access network device 10 may be referred to as an interface 2 (for example, a Uu interface), and use a cellular network frequency band (for example, 1.8 GHz). Names of the interface 1 and the interface 2 are merely examples. The names of the interface 1 and the interface 2 are not limited in this embodiment of this application.

The terminal device 21 or the terminal device 22 may be a device having a wireless communication function. The terminal device 21 or the terminal device 22 may be deployed on land, and includes an indoor device, an outdoor device, a handheld device, or a vehicle-mounted device. Alternatively, the terminal device may be deployed on water (for example, on a ship), or may be deployed in the air (for example, on an airplane, a balloon, or a satellite). The terminal device, also referred to as user equipment (UE), a mobile station (MS), a mobile terminal (MT), a terminal device, and the like, is a device that provides voice and/or data connectivity for a user. For example, the terminal device includes a handheld device, a vehicle-mounted device, and the like that have a wireless connection function. Currently, the terminal device may be a mobile phone, a tablet computer, a notebook computer, a palmtop computer, a mobile internet device (MID), a wearable device (for example, a smartwatch, a smartband, or a pedometer), a vehicle-mounted device (for example, the vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal device in a smart grid, a wireless terminal device in transportation safety, a wireless terminal device in a smart city, a wireless terminal device in a smart home, a flight device (for example, an intelligent robot, a hot balloon, an unmanned aerial vehicle, or an aircraft), or the like. In an example application scenario of this application, the terminal device is a terminal device that often operates on land, for example, a vehicle-mounted device. In this application, for ease of description, a chip deployed in the foregoing device, for example, a system-on-a-chip (SOC), a baseband chip, or another chip having a communication function, may also be referred to as a terminal device.

The terminal device 21 or the terminal device 22 may be a vehicle having a corresponding communication function, a vehicle-mounted communication apparatus, or another embedded communication apparatus, or may be a handheld communication device of a user, including a mobile phone, a tablet computer, or the like.

For example, in this embodiment of this application, the terminal device 21 or the terminal device 22 may further include a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application and need to work with other devices such as smartphones, such as various smart bands or smart jewelry for monitoring physical signs.

The access network device 10 is an entity that is used in cooperation with the terminal device 21 or the terminal device 22 and that may be configured to transmit or receive a signal. For example, the access network device may be an access point (AP) in a wireless local area network (WLAN), or may be an evolved NodeB (eNB or eNodeB) in LTE, a relay station or an access point, a vehicle-mounted device, a wearable device, a network device in a future 5G network, or an access network device in a future evolved PLMN network.

In addition, in the embodiments of this application, the access network device provides a service for a cell, and the terminal device communicates with the access network device by using a transmission resource (for example, a time domain resource, a frequency domain resource, or a time-frequency resource) used in the cell. The cell may be a cell corresponding to the access network device (for example, a base station). The cell may belong to a macro base station, or may belong to a base station corresponding to a small cell. The small cell herein may include a metro cell, a micro cell, a pico cell, a femto cell, or the like. These small cells are characterized by small coverage and low transmit power, and are applicable to providing a high-rate data transmission service.

The following describes terms used in the embodiments of this application.

A sidelink (SL) is defined for direct communication between terminal devices, that is, a link over which terminal devices directly communicate with each other without the help of forwarding performed by a network device.

A physical layer of the sidelink mainly includes four types of channels: a physical sidelink control channel (PSCCH), a physical sidelink shared channel (PSSCH), a physical sidelink broadcast channel, and a physical sidelink feedback channel (PSFCH). In embodiments of this application, the physical sidelink control channel may be referred to as a PSCCH or a sidelink control channel, the physical sidelink shared channel may be referred to as a PSSCH or a sidelink data channel, and the physical sidelink feedback channel may be referred to as a PSFCH or a sidelink feedback channel.

A time-frequency resource for sidelink communication is configured based on a resource pool for sidelink communication. The resource pool may be a set of time resources and frequency resources for sidelink communication. The time resource may also be referred to as a time domain resource, and the frequency resource may also be referred to as a time domain resource.

The time domain resource may be represented by using a frame, a subframe, a slot, a symbol, or the like. One frame may include a plurality of subframes, one subframe may include a plurality of slots, and one slot may include a plurality of symbols. For example, one slot may include 14 symbols. The frequency domain resource may be represented by using a subchannel, a physical resource block (PRB), a subcarrier (SC), or the like. One subchannel may include a plurality of continuous PRBs in frequency domain, and one PRB may include a plurality of subcarriers. The PRB may also be referred to as a resource block (RB).

In addition, the PSCCH may occupy a plurality of continuous PRBs in one subchannel in frequency domain, the PSSCH may occupy one subchannel or a plurality of continuous subchannels in frequency domain, and the PSCCH and the PSSCH may occupy one or more SL time units in time domain. Each time unit may include a plurality of continuous symbols. The plurality of continuous symbols may be configured by using radio resource control (RRC) signaling, and may be specifically determined by configuring a start symbol position $1_{sym}^{start}$ and a number of symbols. For example, if RRC signaling configures a start symbol position $1_{sym}^{start}$ of an SL time unit to 0 and configures a number of symbols to 14, the time unit may be a slot.

A sidelink data channel demodulation reference signal (DMRS) is a reference signal for demodulating a PSSCH, and may also be referred to as a pilot signal for demodulating the PSSCH. In this specification, the sidelink data channel demodulation reference signal may be represented as PSSCH DMRS for short.

In this embodiment of this application, a DMRS configuration in the following may be a DMRS time domain pattern configuration, that is, the DMRS configuration and the DMRS time domain pattern configuration may be interchangeably used. In the following, a number of REs on the first time-frequency resource that are for data transmission may be a number of REs occupied by data carried on the first time-frequency resource, may be referred to as a number of available REs on the first time-frequency resource, or may be a number of REs on the first time-frequency resource that are allocated for the PSSCH (the total number of REs allocated for PSSCH). The foregoing descriptions may be interchangeably used. In the following, a number of REs for data transmission in a PRB in a first time unit may also be replaced with a number of REs allocated for the PSSCH within a PRB (the number of REs allocated for PSSCH within a PRB). A symbol in this specification may be an orthogonal frequency division multiplexing (OFDM) symbol, that is, a symbol in this specification may be replaced with an OFDM symbol.

Figure 2:
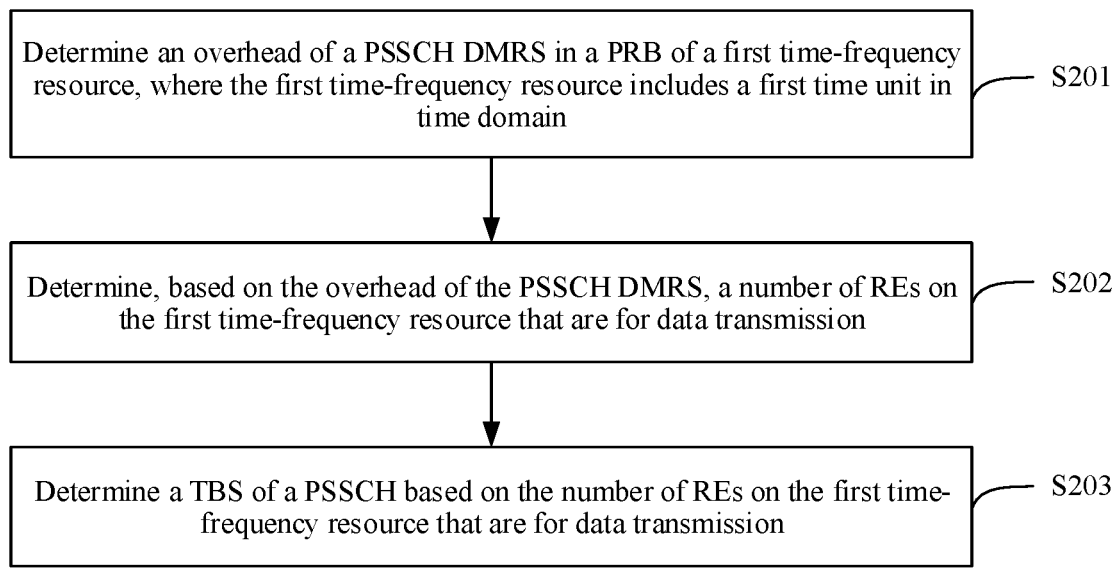
FIG. 2 is a schematic flowchart of a method for determining a transport block size according to an embodiment of this application.

FIG. 2 is a schematic flowchart of a method for determining a transport block size according to this application. The method may be applied to a transmit end, or may be applied to a receive end. The transmit end and the receive end may be two terminal devices that communicate with each other in a D2D manner. For example, the transmit end may be referred to as a first terminal device, and the receive end may be referred to as a second terminal device. The following describes each step in the method in detail.

S201: Determine an overhead of a PSSCH DMRS in a PRB of a first time-frequency resource, where the first time-frequency resource includes a first time unit in time domain.

The first time-frequency resource is a time-frequency resource for sidelink communication, and the time-frequency resource may include a time domain resource and a frequency domain resource. The first time-frequency resource may include the first time unit in time domain. The first time unit may include a plurality of symbols. The first time unit may be configured by a network side device. The network side device may be an access network device or a core network device. For example, the network side device may configure the first time unit by configuring the first start symbol in the plurality of symbols and the number of the plurality of symbols. The first time-frequency resource may include one subchannel or a plurality of continuous subchannels in frequency domain. Each subchannel may include a plurality of continuous PRBs in frequency domain. The one subchannel or the plurality of continuous subchannels may be configured by the network side device. For example, for any subchannel, the network side device may configure a sequence number of the first PRB in a plurality of PRBs included in the subchannel and a number of PRBs included in the subchannel. A PSSCH and the PSSCH DMRS may occupy the one subchannel or the plurality of continuous subchannels, and a PSCCH may occupy a plurality of continuous PRBs in one subchannel.

Figure 3:
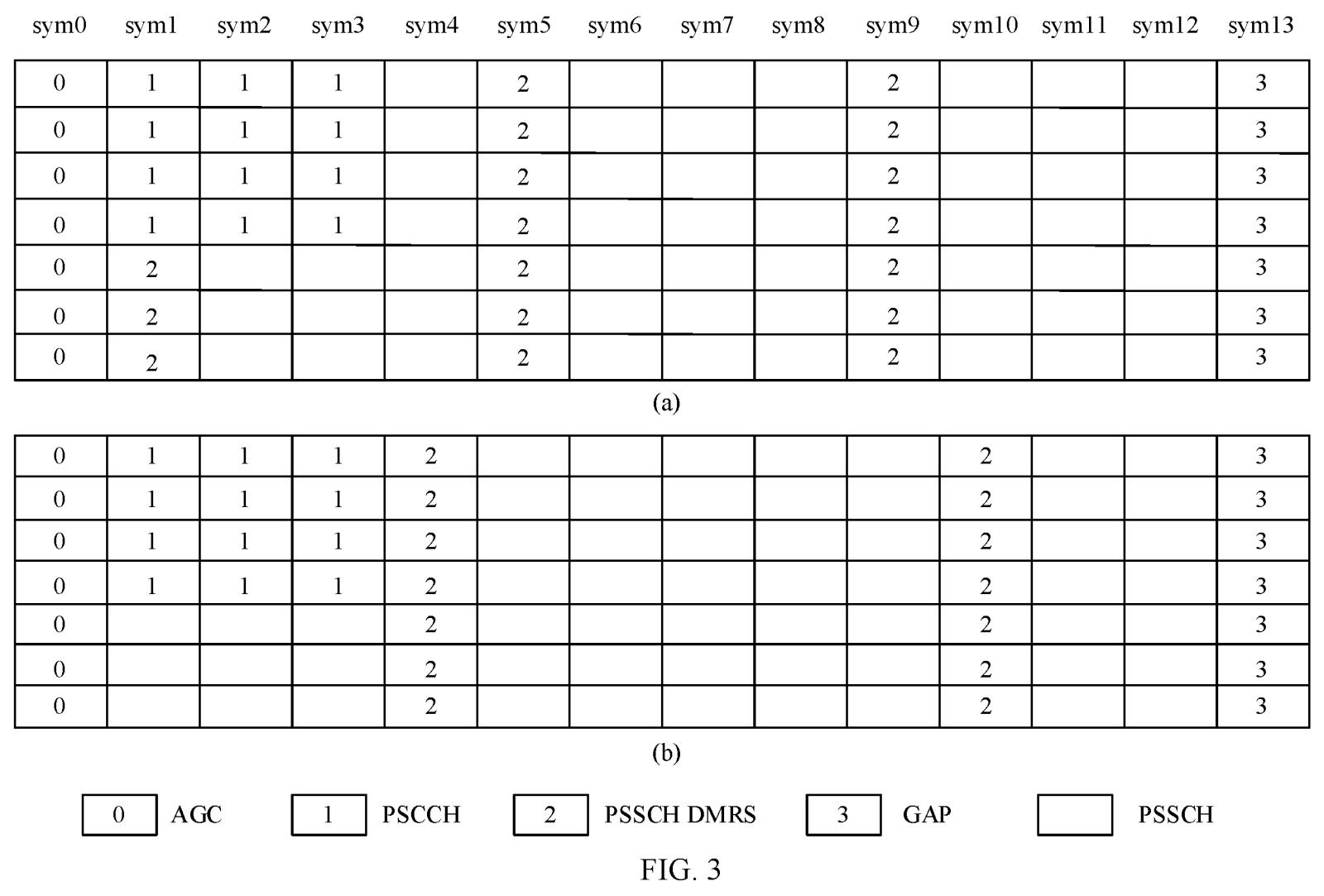

For example, as shown in FIG. 3, the first time unit of the first time-frequency resource in time domain may include 14 symbols which are sequentially represented as sym0 to sym13, and subchannels occupied by the first time-frequency resource in frequency domain may include a total of seven PRBs. On the first time-frequency resource, there may be two cases for the PSSCH DMRS and the PSCCH in time domain: The PSSCH DMRS and the PSCCH overlap in time domain (as shown in (a) in FIG. 3), and the PSSCH DMRS and the PSCCH do not overlap in time domain (as shown in (b) in FIG. 3). AGC in FIG. 3 represents an automatic gain control (AGC) symbol, and a length of the AGC symbol may be one symbol (as shown in FIG. 3) or the first Y symbols in the first time unit, where Y is a natural number, for example, 1, 2, or 3. GAP indicates the last gap symbol.

In addition, the overhead of the PSSCH DMRS may be an average number of REs occupied by the PSSCH DMRS, and the overhead of the PSSCH DMRS in a PRB of the first time-frequency resource may be an average number of REs occupied by the PSSCH DMRS in a physical resource including the first time unit in time domain and one PRB in frequency domain.

Optionally, the determining an overhead of a PSSCH DMRS in a PRB of a first time-frequency resource may include: determining the overhead of the PSSCH DMRS in one PRB of the first time-frequency resource based on a number of DMRS symbols in each DMRS configuration in a DMRS configuration set corresponding to the first time-frequency resource.

The DMRS configuration set corresponding to the first time-frequency resource may be configured by the network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS.

For example, if the DMRS configuration set corresponding to the first time-frequency resource is {2, 3, 4}, the DMRS configuration set includes three DMRS configurations. The DMRS configuration of {2} indicates that the corresponding number of DMRS symbols is 2. The DMRS configuration of {3} indicates that the corresponding number of DMRS symbols is 3. The DMRS configuration of {4} indicates that the corresponding number of DMRS symbols is 4.

Specifically, the overhead of the PSSCH DMRS in one PRB of the first time-frequency resource may be specifically determined based on a number of DMRS configurations in the DMRS configuration set corresponding to the first time-frequency resource, the number of DMRS symbols in each DMRS configuration, a number of subcarriers in one PRB, and a frequency-domain density.

For example, if N represents the number of DMRS configurations in the DMRS configuration set corresponding to the first time-frequency resource, $k_n$ represents the number of DMRS symbols in each DMRS configuration, $N_{SC}^{PRB}$ represents the number of subcarriers in one PRB, and P represents a DMRS frequency domain density (that is, a DMRS is mapped to one RE in every P REs), where P is a positive integer. The overhead $N_{DMRS}^{PRB}$ of the PSSCH DMRS satisfies the following formula (1-1):

$$N_{DMRS}^{PRB} = \frac{1}{N}\sum_{n=0}^{N-1}(N_{SC}^{PRB} \times k_n)/P \qquad (1\text{-}1)$$

P may be a constant. For example, P may be equal to 2, 3, or 4. A specific value of P may be preset. When P=2, the overhead $N_{DMRS}^{PRB}$ of the PSSCH DMRS satisfies the following formula (1-2):

$$N_{DMRS}^{PRB} = \frac{1}{N}\sum_{n=0}^{N-1}(N_{SC}^{PRB} \times k_n)/2 \qquad (1\text{-}2)$$

For example, assuming that the first time unit includes 14 symbols, and one PRB includes 12 subcarriers, when P=2, a relationship between the following seven DMRS configuration sets and the overhead $N_{DMRS}^{PRB}$ of the PSSCH DMRS in one PRB is specifically as shown in Table 1.

TABLE 1

| Sequence number | DMRS configuration set | $N_{DMRS}^{PRB}$ |
|---|---|---|
| 1 | {2} | 12 |
| 2 | {3} | 18 |
| 3 | {4} | 24 |
| 4 | {2, 3} | 15 |
| 5 | {2, 4} | 18 |
| 6 | {3, 4} | 21 |
| 7 | {2, 3, 4} | 18 |

S202: Determine, based on the overhead of the PSSCH DMRS, a number of REs on the first time-frequency resource that are for data transmission, where the number of REs for data transmission is for determining a TBS of the PSSCH.

Data in the REs for data transmission is data of a transport block TB, and the data does not include control information, a DMRS, another reference signal (RS), or the like. The number of REs on the first time-frequency resource that are for data transmission may be a number of REs occupied by data carried on the first time-frequency resource, may be referred to as a number of available REs on the first time-frequency resource, or may be a number of REs on the first time-frequency resource that are allocated for the PSSCH. When the overhead of the PSSCH DMRS in one PRB of the first time-frequency resource is determined, the number of REs on the first time-frequency resource that are for data transmission may be determined based on the overhead of the PSSCH DMRS.

Optionally, the number of REs on the first time-frequency resource that are for data transmission is further related to at least one of the following: the number of subcarriers in one PRB, a number of reference symbols for the PSSCH in one PRB in the first time unit, an overhead of a phase tracking reference signal (PTRS) and/or a channel state information reference signal (CSI-RS) in one PRB, a number of PRBs included in the PSSCH on the first time-frequency resource, an overhead of first control information on the first time-frequency resource, and an overhead of second control information on the first time-frequency resource.

The PSCCH carries the first control information that may specifically include demodulation information such as physical layer resource information of a sidelink data channel, DMRS configuration information, a number of DMRS ports, a modulation and code signal (MCS), and a format of the second control information. The PSSCH carries data information and the second control information. The second control information mainly carries control information other than the PSSCH DMRS, and may specifically include information such as channel state information (CSI) reporting trigger information, an IP of a target user of the PSSCH, a PSSCH HARQ process number, a new data indicator, and a HARQ transmission version number.

In addition, the overhead of the PTRS and/or the overhead of the CSI-RS may be an average number of REs occupied by the PTRS and/or the CSI-RS. The overhead of the first control information may be an average number of REs occupied by the first control information, or a number of REs occupied by the first control information. The overhead of the second control information may be an average number of REs occupied by the second control information. The average number of REs occupied by each of the PTRS and/or the CSI-RS, the first control information, and the second control information may also be referred to as a number of occupied REs.

In addition, the number of reference symbols for the PSSCH in one PRB in the first time unit may be preconfigured, or may be configured by the network side device. The number of reference symbols for the PSSCH in the first time unit may be a number of symbols obtained by excluding the following symbol overheads from the first time unit: a PSCCH symbol overhead, a PSFCH symbol overhead, an automatic gain control (AGC) symbol, and the last gap (GAP) symbol. The AGC symbol is the first Y symbols in the first time unit, where Y is a natural number, for example, 1, 2, or 3.

Specifically, if $N_{SC}^{PRB}$ represents the number of subcarriers in one PRB, $N_{sym}^{sh'}$ represents the number of reference symbols for the PSSCH in one PRB in the first time unit, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource, the number of REs, $N_{RE}$, on the first time-frequency resource that are for data transmission satisfies the following formula (1-3):

$$N_{RE}=(N_{SC}^{PRB} \times N_{sym}^{sh'} - N_{DMRS}^{PRB} - x) \times M_{PSSCH}^{PRB} - N_{SCI1} - N_{SCI2} \qquad (1\text{-}3)$$

Alternatively, if a number of REs in one PRB that are used to determine the TBS has an upper limit, and Q represents the upper limit of the number of REs in one PRB that are used to determine the TBS, the number of REs $N_{RE}$ on the first time-frequency resource that are for data transmission satisfies the following formula (1-4):

$$N_{RE}=\min(Q,N'_{RE}) \times M_{PSSCH}^{PRB} - N_{SCI1} - N_{SCI2} \qquad (1\text{-}4)$$

In the formula (1-4), satisfies $N'_{RE}$ satisfies $N'_{RE}=N_{SC}^{PRB} * N_{sym}^{sh'} - N_{DMRS}^{PRB} - x$, and $N'_{RE}$ represents the number of REs in one PRB in the first time unit that are for data transmission. Alternatively, the number of REs in one PRB in the first time unit that are for data transmission may be replaced with a number of REs allocated for the PSSCH in one PRB (the number of REs allocated for PSSCH within a PRB). Therefore, the number $N_{RE}$ of REs on the first time-frequency resource that are for data transmission satisfies the following formula (1-5):

$$N_{RE}=\min(Q,N_{SC}^{PRB} \times N_{sym}^{sh'} - N_{DMRS}^{PRB} - x) \times M_{PSSCH}^{PRB} - N_{SCI1} - N_{SCI2} \qquad (1\text{-}5)$$

Q is a positive integer. For example, Q may be equal to 132, 144, or 156. Alternatively, $Q=12*(N_{sym}-a)$, where the value range of a is an integer such as 1, 2, or 3. $N_{sym}$ represents a number of symbols in the first time unit (which may also be referred to as a symbol length of the first time unit). a represents a symbol overhead in the first time unit, and the symbol overhead may include at least one of the AGC symbol, the last GAP symbol, or the like.

S203: Determine the TBS of the PSSCH based on the number of REs on the first time-frequency resource that are for data transmission.

Specifically, when the number of REs on the first time-frequency resource that are for data transmission is determined, the TBS of the PSSCH may be determined based on the number of REs on the first time-frequency resource that are for data transmission, and a comparison table between an MCS and a target code rate.

The comparison table between the MCS and the target code rate may be as shown in the following Table 2, and includes modulation orders, target code rates, and spectral efficiency that correspond to different MCS indexes. In Table 2, $I_{MCS}$ represents the MCS index, $Q_m$ represents the modulation order, and R represents the target code rate.

TABLE 2

| MCS index ($I_{MCS}$) | Modulation order $Q_m$ | Target code rate R*1024 | Spectral efficiency (%) |
| --- | --- | --- | --- |
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | Reserved (reserved) | |
| 29 | 2 | Reserved | |
| 30 | 4 | Reserved | |
| 31 | 6 | Reserved | |

It should be noted that the method for determining the TBS of the PSSCH in step S203 is consistent with a method for determining a TBS of a PSSCH in an existing NR system. For details, refer to descriptions of the related technologies. Details are not described herein in this embodiment of this application.

Optionally, the method may further include: The transmit end transmits a transport block based on the TBS. Correspondingly, the receive end receives the transport block based on the TBS, that is, the receive end performs channel decoding on the transport block.

In this embodiment of this application, for initial transmission or retransmission of data, both the transmit end and the receive end may first determine the overhead of the PSSCH DMRS in the PRB of the first time-frequency resource, and determine, based on the overhead of the PSSCH DMRS, the number of REs on the first time-frequency resource that are for data transmission. The overhead of the PSSCH DMRS is an average number of REs occupied by the PSSCH DMRS in a plurality of DMRS configurations, instead of an actual number of REs occupied by the PSSCH DMRS in one transmission. Therefore, for initial transmission and retransmission, the number of REs for data transmission remains unchanged, where the number of REs is determined based on the overhead of the PSSCH DMRS, and the TBS determined based on the number of REs for data transmission is the same. Therefore, according to the method provided in this embodiment of this application, transport blocks for initial transmission and retransmission in a sidelink communication process can be combined, to achieve a combined gain.

In addition, in this application, the TBS is determined based on the number of REs for data transmission, where the number of REs is determined based on the overhead of the PSSCH DMRS. Therefore, in this embodiment of this application, the PSSCH may be allowed to carry different quantities of DMRS symbols in initial transmission and retransmission processes of one TBS. In addition, different quantities of DMRS symbols are set, so that when a signal to interference plus noise ratio (SINR) decreases, the PSSCH decoding efficiency may be improved by increasing the number of DMRS symbols, or when the SINR increases, the channel throughput of the PSSCH may be improved by decreasing the number of DMRS symbols.

Figure 4:
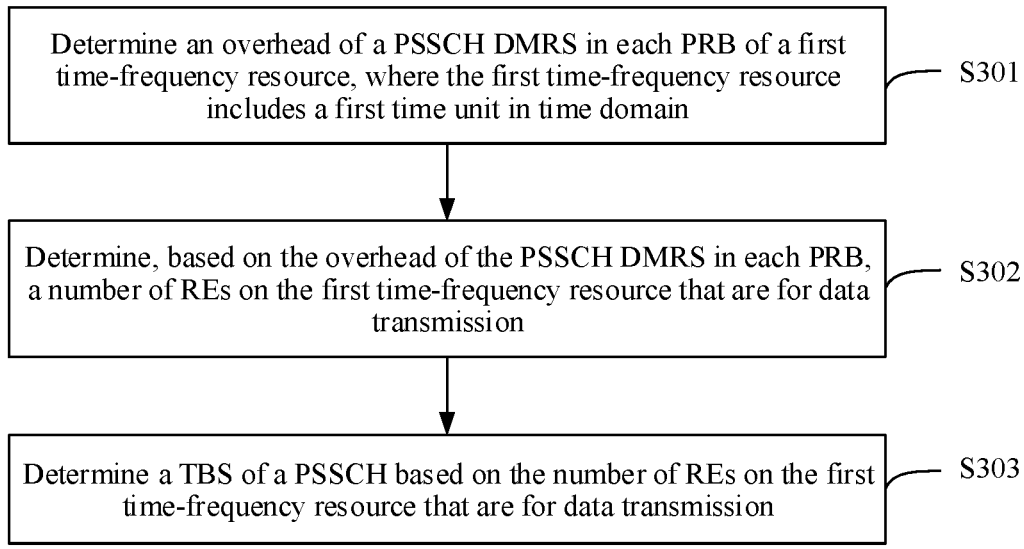
FIG. 4 is a schematic flowchart of another method for determining a transport block size according to an embodiment of this application.

FIG. 4 is a schematic flowchart of another method for determining a transport block size according to an embodiment of this application. The method may be applied to a transmit end, or may be applied to a receive end. The transmit end and the receive end may be two terminal devices that communicate with each other in a D2D manner. For example, the transmit end may be referred to as a first terminal device, and the receive end may be referred to as a second terminal device. The following describes each step in the method in detail.

S301: Determine an overhead of a PSSCH DMRS in each PRB of a first time-frequency resource, where the first time-frequency resource includes a first time unit in time domain.

The first time-frequency resource is a time-frequency resource for sidelink communication, and the time-frequency resource may include a time domain resource and a frequency domain resource. The first time-frequency resource may include the first time unit in time domain. The first time unit may include a plurality of symbols. The first time unit may be configured by a network side device. The network side device may be an access network device or a core network device. For example, the network side device may configure the first time unit by configuring the first start symbol in the plurality of symbols and the number of the plurality of symbols. The first time-frequency resource may include one subchannel or a plurality of continuous subchannels in frequency domain. Each subchannel may include a plurality of continuous PRBs in frequency domain.

The one subchannel or the plurality of continuous subchannels may be configured by the network side device. For example, for any subchannel, the network side device may configure a sequence number of the first PRB in a plurality of PRBs included in the subchannel and a number of PRBs included in the subchannel. A PSSCH and the PSSCH DMRS may occupy the one subchannel or the plurality of continuous subchannels, and a PSCCH may occupy a plurality of continuous PRBs in one subchannel.

For example, as shown in FIG. 3, the first time unit of the first time-frequency resource in time domain may include 14 symbols which are sequentially represented as sym0 to sym13, and subchannels occupied by the first time-frequency resource in frequency domain may include a total of seven PRBs. On the first time-frequency resource, there may be two cases for the PSSCH DMRS and the PSCCH in time domain: The PSSCH DMRS and the PSCCH overlap in time domain (as shown in (a) in FIG. 3), and the PSSCH DMRS and the PSCCH do not overlap in time domain (as shown in (b) in FIG. 3). AGC in FIG. 3 represents an automatic gain control (AGC) symbol, and a length of the AGC symbol may be one symbol (as shown in FIG. 3) or the first Y symbols in the first time unit, where Y is a natural number, for example, 1, 2, or 3. GAP indicates the last gap symbol.

In addition, the overhead of the PSSCH DMRS may be an average number of REs occupied by the PSSCH DMRS. For the overhead of the PSSCH DMRS, a number of DMRS symbols in each DMRS configuration in a PSSCH DMRS configuration set corresponding to the first time-frequency resource needs to be considered, and an impact of the PSCCH on mapping of the PSSCH DMRS needs to be considered. The overhead of the PSSCH DMRS in one PRB of the first time-frequency resource may be an average number of REs occupied by the PSSCH DMRS in a physical resource. The physical resource includes the first time unit in time domain and the PRB in frequency domain. Considering that the impact of the PSCCH on mapping of the PSSCH DMRS is different in each PRB, the overhead of the PSSCH DMRS in each PRB may also be different.

Optionally, the determining an overhead of a PSSCH DMRS in each PRB of a first time-frequency resource may include: determining the overhead of the PSSCH DMRS in one PRB of the first time-frequency resource based on the number of DMRS symbols in each DMRS configuration in the DMRS configuration set corresponding to the first time-frequency resource, and whether a DMRS symbol in each DMRS configuration overlaps a PSSCH symbol (a symbol occupied by the PSSCH) in time domain.

The DMRS configuration set corresponding to the first time-frequency resource may be configured by the network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS.

For example, if the DMRS configuration set corresponding to the first time-frequency resource is {2, 3, 4}, the DMRS configuration set includes three DMRS configurations. The DMRS configuration of {2} indicates that the corresponding number of DMRS symbols is 2. The DMRS configuration of {3} indicates that the corresponding number of DMRS symbols is 3. The DMRS configuration of {4} indicates that the corresponding number of DMRS symbols is 4.

Specifically, for a PRB of the first time-frequency resource, if whether a DMRS symbol in each DMRS configuration overlaps a PSSCH symbol in the PRB in time domain is not considered, the overhead of the PSSCH DMRS in the PRB may be specifically determined based on the number of DMRS configurations in the DMRS configuration set corresponding to the first time-frequency resource, the number of DMRS symbols in each DMRS configuration, a number of subcarriers in one PRB, and a frequency-domain density.

For example, if N represents the number of DMRS configurations in the PSSCH DMRS configuration set corresponding to the first time-frequency resource, $k_n$ represents the number of DMRS symbols in each DMRS configuration, $N_{SC}^{PRB}$ represents the number of subcarriers in one PRB, and P represents a DMRS frequency domain density (that is, a DMRS is mapped to one RE in every P REs), where P is a positive integer. The overhead $N_{DMRS}^{PRB}$ of the PSSCH DMRS in the PRB satisfies the following formula (2-1):

$$N_{DMRS}^{PRB} = \frac{1}{N}\sum_{n=0}^{N-1}(N_{SC}^{PRB} \times k_n)/P \qquad (2\text{-}1)$$

P may be a constant. For example, P may be equal to 2, 3, or 4. A specific value of P may be preset. When P=2, the overhead $N_{DMRS}^{PRB}$ of the PSSCH DMRS in the PRB satisfies the following formula (2-2):

$$N_{DMRS}^{PRB} = \frac{1}{N}\sum_{n=0}^{N-1}(N_{SC}^{PRB} \times k_n)/2 \qquad (2\text{-}2)$$

For example, assuming that the first time unit includes 14 symbols, and one PRB includes 12 subcarriers, when P=2, a relationship between the seven DMRS configuration sets in Table 1 above and the overhead $N_{DMRS}^{PRB}$ of the PSSCH DMRS in the PRB may be specifically as shown in Table 1.

Further, considering whether a DMRS symbol in each DMRS configuration in the DMRS configuration set overlaps a PSCCH symbol in time domain, the overhead of the PSSCH DMRS in one PRB of the first time-frequency resource may be specifically determined as described below.

For example, as shown in (a) and (b) in FIG. 3, two PSSCH DMRS configurations are configured on the first time-frequency resource: a two-symbol DMRS configuration and a three-symbol DMRS configuration. If the first DMRS symbol overlaps the PSCCH in time domain in the three-symbol DMRS configuration, impact brought by the PSCCH needs to be considered in a PRB in which the PSCCH is located.

Specifically, the overhead of the PSSCH DMRS in one PRB may be determined based on the number of DMRS configurations in the PSSCH DMRS configuration set corresponding to the first time-frequency resource, the number of DMRS symbols in each DMRS configuration, whether a DMRS symbol in each DMRS configuration overlaps a PSCCH symbol in time domain, the number of subcarriers in one PRB, and the frequency domain density.

For example, for an $i^{th}$ PRB of the first time-frequency resource, if the PSCCH overlaps a DMRS symbol in at least one DMRS configuration in the PSSCH DMRS configuration set in time domain, the overhead of the PSSCH DMRS in the PRB satisfies the following formulas (2-3-1) and (2-3-2):

$$N_{DMRS,i}^{PRB} = N_{DMRS}^{PRB} - 6 \qquad (2\text{-}3\text{-}1),$$

where i ranges from 0 to $M_{PSCCH}^{PRB} - 1$.

$$N_{DMRS,i}^{PRB} = N_{DMRS}^{PRB} \qquad (2\text{-}3\text{-}2),$$

where i ranges from $M_{PSCCH}^{PRB}$ to $M_{PSSCH}^{PRB} - 1$.

For an $i^{th}$ PRB of the first time-frequency resource, if the PSCCH does not overlap a DMRS symbol in at least one DMRS configuration in the PSSCH DMRS configuration set in time domain, the overhead $N_{DMRS,i}^{PRB}$ of the PSSCH DMRS in the PRB satisfies the following formula (2-4):

$$N_{DMRS,i}^{PRB} = N_{DMRS}^{PRB} \qquad (2\text{-}4),$$

where i ranges from 0 to $M_{PSSCH}^{PRB} - 1$.

i represents an index of a PRB of the first time-frequency resource, $M_{PSCCH}^{PRB}$ represents a number of PRBs included in a PSCCH on the first time-frequency resource, $M_{PSSCH}^{PRB}$ represents a number of PRBs included in a PSSCH on the first time-frequency resource, $N_{DMRS,i}^{PRB}$ represents the overhead of the PSSCH DMRS in the $i^{th}$ PRB of the first time-frequency resource, and $N_{DMRS}^{PRB}$ satisfies the foregoing formula (2-1). When P=2, $N_{DMRS}^{PRB}$ may also be obtained from Table 1.

In another embodiment, the overhead of the PSSCH DMRS in each PRB of the first time-frequency resource may be determined based on a number of symbols actually mapped in each PRB in the PSSCH DMRS configuration set corresponding to the first time-frequency resource.

For example, as shown in (a) and (b) in FIG. 3, two DMRS configurations are configured on the first time-frequency resource: a two-DMRS-symbol DMRS configuration and a three-DMRS-symbol DMRS configuration. The first DMRS symbol in the three-DMRS-symbol DMRS configuration overlaps the PSCCH in time domain. In this case, in four PRBs that overlap the PSCCH in frequency domain, two DMRS symbols are mapped in both the two DMRS configurations, and an overhead of a PSSCH DMRS in the four PRBs may be determined based on the two DMRS symbols. In the remaining three PRBs that do not overlap the PSCCH in frequency domain, two and three DMRS symbols are respectively mapped in the two PSSCH DMRS configurations, and an overhead of a PSSCH DMRS in the three PRBs may be determined based on an average value of 2 and 3.

For example, if N represents the number of DMRS configurations in the PSSCH DMRS configuration set corresponding to the first time-frequency resource, $k_n$ represents the number of DMRS symbols in each DMRS configuration, $N_{SC}^{PRB}$ represents the number of subcarriers in one PRB, and P represents a DMRS frequency domain density (that is, a DMRS is mapped to one RE in every P REs), where P is a positive integer. If a DMRS symbol in each DMRS configuration in the PSSCH DMRS configuration set does not overlap the PSCCH in time domain, the overhead $N_{DMRS,i}^{PRB}$ of the PSSCH DMRS in the $i^{th}$ PRB of the first time-frequency resource satisfies the following formula (2-5):

$$N_{DMRS,i}^{PRB} = N_{DMRS}^{PRB} \qquad (2\text{-}5),$$

where i ranges from 0 to $M_{PSSCH}^{PRB} - 1$, and $$N_{DMRS}^{PRB} = \frac{1}{N}\sum_{n=0}^{N-1}(N_{SC}^{PRB} \times k_n)/P.$$

For an $i^{th}$ PRB of the first time-frequency resource, if the PSCCH overlaps a DMRS symbol in time domain in at least one DMRS configuration in the DMRS configuration set, the overhead $N_{DMRS,i}^{PRB}$ of the PSSCH DMRS in the PRB satisfies the following formula (2-6):

$$N_{DMRS,i}^{PRB} = \frac{1}{N}\sum_{n=0}^{N-1}\left(N_{SC}^{PRB} \times k'_{n,i}\right)/P$$

(2-6), where i ranges from 0 to $M_{PSSCH}^{PRB}-1$.

If a DMRS symbol in an $n^{th}$ PSSCH DMRS configuration overlaps the PSCCH in time domain, $k'_{n,i}$ satisfies the following formulas (2-7-1) and (2-7-2):

$$k'_{n,i}=k_n-1 \qquad (2\text{-}7\text{-}1),$$

where i ranges from 0 to $M_{PSCCCH}^{PRB}-1$.

$$k'_{n,i}=k_n \qquad (2\text{-}7\text{-}2),$$

where i ranges from $M_{PSCCH}^{PRB}$ to $M_{PSSCH}^{PRB}-1$.

If a DMRS symbol in an $n^{th}$ PSSCH DMRS configuration does not overlap the PSCCH in time domain, $k'_{n,i}$ satisfies the following formula (2-8):

$$k'_{n,i}=k_n \qquad (2\text{-}8),$$

where i ranges from 0 to $M_{PSSCH}^{PRB}-1$.

S302: Determine, based on the overhead of the PSSCH DMRS in each PRB, a number of REs on the first time-frequency resource that are for data transmission, where the number of REs for data transmission is for determining a TBS of the PSSCH.

Data in the REs for data transmission is data of a transport block TB, and the data does not include control information, a DMRS, another reference signal (reference signal, RS), or the like. The number of REs on the first time-frequency resource that are for data transmission may be a number of REs occupied by data carried on the first time-frequency resource, may be referred to as a number of available REs on the first time-frequency resource, may be a number of REs on the first time-frequency resource that are allocated for a PSSCH channel, or may be a number of REs on the first time-frequency resource that are allocated for the PSSCH (the total number of REs allocated for PSSCH). The several descriptions are equivalent and can be interchangeably used. When the overhead of the PSSCH DMRS in each PRB of the first time-frequency resource is determined, the number of REs on the first time-frequency resource that are for data transmission may be determined based on the overhead of the PSSCH DMRS in each PRB.

Optionally, the number of REs on the first time-frequency resource that are for data transmission is further related to at least one of the following: the number of subcarriers in one PRB, a number of reference symbols for the PSSCH in one PRB in the first time unit, an overhead of a PTRS and/or an overhead of a CSI-RS in one PRB, a number of PRBs included in the PSSCH on the first time-frequency resource, an overhead of first control information on the first time-frequency resource, and an overhead of second control information on the first time-frequency resource.

The PSCCH carries the first control information that may specifically include demodulation information such as physical layer resource information of a sidelink data channel, DMRS configuration information, a number of DMRS ports, a modulation and code signal (MCS), and a format of the second control information. The PSSCH carries data information and the second control information. The second control information mainly carries control information other than the PSSCH DMRS, and may specifically include information such as CSI reporting trigger information, an IP of a target user of the PSSCH, a PSSCH HARQ process number, a new data indicator, and a HARQ transmission version number.

In addition, the overhead of the PTRS and/or the overhead of the CSI-RS may be an average number of REs occupied by the PTRS and/or the CSI-RS, the overhead of the first control information may be an average number of REs occupied by the first control information or a number of REs occupied by the first control information, and the overhead of the second control information may be an average number of REs occupied by the second control information. The average number of REs occupied by each of the PTRS and/or the CSI-RS, the first control information, and the second control information may also be referred to as a number of occupied REs.

In addition, the number of reference symbols for the PSSCH in one PRB in the first time unit may be preconfigured, or may be configured by the network side device. The number of reference symbols for the PSSCH in the first time unit may be a number of symbols obtained by excluding the following symbol overheads from the first time unit: a PSCCH symbol overhead, a PSFCH symbol overhead, an automatic gain control (AGC) symbol, and the last gap (GAP) symbol. The AGC symbol is the first Y symbols in the first time unit, where Y is a natural number, for example, 1, 2, or 3.

Specifically, if $N_{SC}^{PRB}$ represents the number of subcarriers in one PRB, $N_{sym}^{sh'}$ represents the number of reference symbols for the PSSCH in one PRB in the first time unit, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource, the number of REs, $N_{RE}$, on the first time-frequency resource that are for data transmission satisfies the following formula (2-9):

$$N_{RE} = \sum_{i=0}^{M_{PSSCH}^{PRB}-1}\left(N_{SC}^{PRB} \times N_{sym}^{sh'} - N_{DMRS,i}^{PRB} - x\right) - N_{SCI1} - N_{SCI2} \qquad (2\text{-}9)$$

Alternatively, if a number of REs in one PRB that are used to determine the TBS has an upper limit, and Q represents the upper limit of the number of REs in one PRB that are used to determine the TBS, the number of REs $N_{RE}$ on the first time-frequency resource that are for data transmission satisfies the following formula (2-10):

$$N_{RE} = \min\left(Q \times M_{PSSCH}^{PRB}, \sum_{i=0}^{M_{PSSCH}^{PRB}-1} N'_{RE,i}\right) - N_{SCI1} - N_{SCI2} \qquad (2\text{-}10)$$

In the formula (2-10), $N'_{RE,i}=N_{SC}^{PRB}*N_{sym}^{sh'}-N_{DMRS,i}^{PRB}-x$, and $N'_{RE,i}$ represents a number of REs for data transmission in an $i^{th}$ PRB in the first time unit. Alternatively, after the first control information and the second control information are excluded, considering that an average number of REs in one PRB that are used to determine the TBS has an upper limit Q, the number $N_{RE}$ of REs on the first time-frequency resource that are for data transmission satisfies the following formula (2-11):

$$N_{RE} = \min\left(Q \times M_{PSSCH}^{PRB}, \sum_{i=0}^{M_{PSSCH}^{PRB}-1} N'_{RE,i} - N_{SCI1} - N_{SCI2}\right) \quad (2\text{--}11)$$

Q is a positive integer. For example, Q may be equal to 132, 144, or 156. Alternatively, $Q=12*(N_{sym}-a)$, where the value range of a is an integer such as 1, 2, or 3. $N_{sym}$ represents a number of symbols in the first time unit (which may also be referred to as a symbol length of the first time unit). a represents a symbol overhead in the first time unit, and the symbol overhead may include at least one of the AGC symbol, the last GAP symbol, or the like.

S303: Determine the TBS of the PSSCH based on the number of REs on the first time-frequency resource that are for data transmission.

Specifically, when the number of REs on the first time-frequency resource that are for data transmission is determined, the TBS of the PSSCH may be determined based on the number of REs on the first time-frequency resource that are for data transmission, and a comparison table between a modulation and code signal (MCS) and a target code rate. The comparison table between the MCS and the target code rate may be as shown in the foregoing Table 1, and includes modulation orders, target code rates, and spectral efficiency that correspond to different MCS indexes.

It should be noted that the method for determining the TBS of the PSSCH in step S303 is consistent with a method for determining a TBS of a PSSCH in an existing NR system. For details, refer to descriptions of the related technologies. Details are not described herein in this embodiment of this application.

Optionally, the method may further include: The transmit end transmits a transport block based on the TBS. Correspondingly, the receive end receives the transport block based on the TBS, that is, the receive end performs channel decoding on the transport block.

In this embodiment of this application, for initial transmission or retransmission of data, both the transmit end and the receive end may first determine the overhead of the PSSCH DMRS in the PRB of the first time-frequency resource, and determine, based on the overhead of the PSSCH DMRS, the number of REs on the first time-frequency resource that are for data transmission. The overhead of the PSSCH DMRS is an average number of REs occupied by the PSSCH DMRS in a plurality of DMRS configurations, instead of an actual number of REs occupied by the PSSCH DMRS in one transmission. Therefore, for initial transmission and retransmission, the number of REs for data transmission remains unchanged, where the number of REs is determined based on the overhead of the PSSCH DMRS, and the TBS determined based on the number of REs for data transmission is the same. Therefore, according to the method provided in this embodiment of this application, transport blocks for initial transmission and retransmission in a sidelink communication process can be combined, to achieve a combined gain.

In addition, in this application, the TBS is determined based on the number of REs for data transmission, where the number of REs is determined based on the average number of REs occupied by the PSSCH DMRS in the plurality of DMRS configurations on the first time-frequency resource. Therefore, in this embodiment of this application, the PSSCH may be allowed to carry different quantities of DMRS symbols in initial transmission and retransmission processes of one TBS. In addition, different quantities of DMRS symbols are set, so that when a signal to interference plus noise ratio (SINR) decreases, the PSSCH decoding efficiency may be improved by increasing the number of DMRS symbols, or when the SINR increases, the channel throughput of the PSSCH may be improved by decreasing the number of DMRS symbols.

Figure 5:
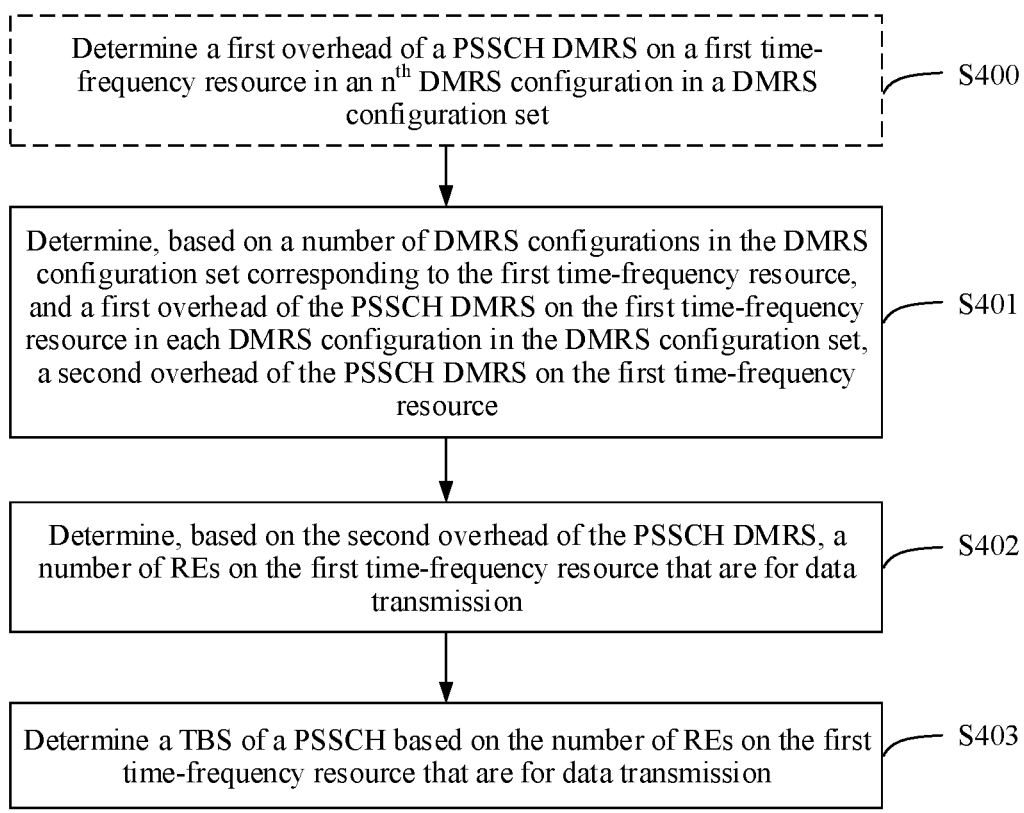
FIG. 5 is a schematic flowchart of another method for determining a transport block size according to an embodiment of this application.

FIG. 5 is a schematic flowchart of another method for determining a transport block size according to an embodiment of this application. The method may be applied to a transmit end, or may be applied to a receive end. The transmit end and the receive end may be two terminal devices that communicate with each other in a D2D manner. For example, the transmit end may be referred to as a first terminal device, and the receive end may be referred to as a second terminal device. The following describes each step in the method in detail.

S401: Determine, based on a number of DMRS configurations in a DMRS configuration set corresponding to a first time-frequency resource, and a first overhead of a PSSCH DMRS on the first time-frequency resource in each DMRS configuration in the DMRS configuration set, a second overhead of the PSSCH DMRS on the first time-frequency resource.

The first time-frequency resource is a time-frequency resource for sidelink communication, and the time-frequency resource may include a time domain resource and a frequency domain resource. The first time-frequency resource may include the first time unit in time domain. The first time unit may include a plurality of symbols. The first time unit may be configured by a network side device. For example, the network side device may configure the first time unit by configuring the first start symbol in the plurality of symbols and the number of the plurality of symbols. The first time-frequency resource may include one subchannel or a plurality of continuous subchannels in frequency domain. Each subchannel may include a plurality of continuous PRBs in frequency domain. The one subchannel or the plurality of continuous subchannels may be configured by the network side device. For example, for any subchannel, the network side device may configure a sequence number of the first PRB in a plurality of PRBs included in the subchannel and a number of PRBs included in the subchannel. A PSSCH and the PSSCH DMRS may occupy one subchannel or a plurality of continuous subchannels, and a PSCCH may occupy a plurality of continuous PRBs in one subchannel. On the first time-frequency resource, the PSSCH DMRS and the PSCCH may overlap or may not overlap in time domain.

In addition, the DMRS configuration set corresponding to the first time-frequency resource may be configured by the network side device or preconfigured to a resource pool to which the first time-frequency resource belongs. The DMRS configuration set may include a plurality of DMRS configurations. The specific number of DMRS symbols is correspondingly set in each DMRS configuration. The DMRS symbol may be occupied by a DMRS or used for transmitting a DMRS. For example, if the DMRS configuration set corresponding to the first time-frequency resource is {2, 3, 4}, the DMRS configuration set includes three DMRS configurations. The DMRS configuration of {2} indicates that the corresponding number of DMRS symbols is 2. The DMRS configuration of {3} indicates that the corresponding number of DMRS symbols is 3. The DMRS configuration of {4} indicates that the corresponding number of DMRS symbols is 4.

In addition, the overhead of the PSSCH DMRS may be an average number of REs occupied by the PSSCH DMRS. The first overhead of the PSSCH DMRS on the first time-frequency resource may be an average number of REs occupied by the PSSCH DMRS on the first time-frequency resource in each DMRS configuration. The second overhead of the PSSCH DMRS may be the average number of REs occupied by the PSSCH DMRS on the first time-frequency resource, and may be specifically an average value of first overheads of the PSSCH DMRS in the plurality of DMRS configurations.

Optionally, if N represents a number of DMRS configurations in the DMRS configuration set corresponding to the first time-frequency resource, and $N_n^{DMRS}$ represents the first overhead of the PSSCH DMRS on the first time-frequency resource in an $n^{th}$ DMRS configuration, the second overhead $N_{DMRS}$ of the PSSCH DMRS on the first time-frequency resource satisfies the following formula (3-1):

$$N_{DMRS} = \frac{1}{N} \sum_{n=0}^{N-1} N_n^{DMRS} \qquad (3-1)$$

Further, as shown in FIG. 5, the method may further include S400: Determine the first overhead of the PSSCH DMRS on the first time-frequency resource in the $n^{th}$ DMRS configuration in the DMRS configuration set.

The first overhead of the PSSCH DMRS on the first time-frequency resource in the $n^{th}$ DMRS configuration is related to at least one of the following: the number of DMRS configurations in the DMRS configuration set, a number of DMRS symbols in the $n^{th}$ DMRS configuration, a number of subcarriers in one PRB, a number of PRBs included in the PSSCH, and a DMRS frequency domain density.

For example, if $N_n^{DMRS}$ represents the first overhead of the PSSCH DMRS on the first time-frequency resource, $N_{SC}^{PRB}$ represents the number of subcarriers in one PRB, $k_n$ represents the number of DMRS symbols in the $n^{th}$ DMRS configuration, $M_{PSSCH}^{PRB}$ represents the number of PRBs included in the PSSCH, and P represents the DMRS frequency domain density (that is, a DMRS is mapped to one RE in every P REs), where P is a positive integer. When the PSSCH DMRS does not overlap the PSCCH in time domain, the first overhead $N_n^{DMRS}$ of the PSSCH DMRS on the first time-frequency resource satisfies the following formula (3-2). When the PSSCH DMRS overlaps the PSCCH in time domain, the first overhead $N_n^{DMRS}$ of the PSSCH DMRS on the first time-frequency resource satisfies the following formula (3-3):

$$N_n^{DMRS} = N_{SC}^{PRB} \times k_n \times \frac{M_{PSSCH}^{PRB}}{P} \qquad (3-2)$$

$$N_n^{DMRS} = N_{SC}^{PRB} \times k_n \times \frac{M_{PSSCH}^{PRB}}{P} - N_{SC}^{PRB} \times \frac{M_{PSSCH}^{PRB}}{P} \qquad (3-3)$$

P may be a constant. For example, P may be equal to 2, 3, or 4. A specific value of P may be preset. When P=2, when the PSSCH DMRS does not overlap the PSCCH in time domain, the first overhead $N_n^{DMRS}$ of the PSSCH DMRS on the first time-frequency resource satisfies the following formula (3-4). When the PSSCH DMRS overlaps the PSCCH in time domain, the first overhead $N_n^{DMRS}$ of the PSSCH DMRS on the first time-frequency resource satisfies the following formula (3-5):

$$N_n^{DMRS} = N_{SC}^{PRB} \times k_n \times \frac{M_{PSSCH}^{PRB}}{2} \qquad (3-4)$$

$$N_n^{DMRS} = N_{SC}^{PRB} \times k_n * \frac{M_{PSSCH}^{PRB}}{2} - N_{SC}^{PRB} \times \frac{M_{PSSCH}^{PRB}}{2} \qquad (3-5)$$

It should be noted that, for an example in which the PSSCH DMRS on the first time-frequency resource overlaps the PSCCH in time domain, refer to (a) in FIG. 3. For an example in which the PSSCH DMRS does not overlap the PSCCH in time domain, refer to (b) in FIG. 3.

S402: Determine, based on the second overhead of the PSSCH DMRS, a number of REs on the first time-frequency resource that are for data transmission.

Data in the REs for data transmission is data of a transport block TB, and the data does not include control information, a DMRS, another reference signal, or the like. The number of REs on the first time-frequency resource that are for data transmission may be a number of REs occupied by data carried on the first time-frequency resource, or may be referred to as a number of available REs on the first time-frequency resource. When the second overhead of the PSSCH DMRS on the first time-frequency resource is determined, the number of REs on the first time-frequency resource that are for data transmission may be determined based on the second overhead of the PSSCH DMRS.

Optionally, the number of REs on the first time-frequency resource that are for data transmission is further related to at least one of the following: a number of subcarriers in one PRB, a number of reference symbols for the PSSCH in a first time unit, an overhead of a PTRS and/or an overhead of a CSI-RS in one PRB, a number of PRBs included in the PSSCH on the first time-frequency resource, an overhead of first control information on the first time-frequency resource, and an overhead of second control information on the first time-frequency resource.

The PSCCH may carry the first control information that may specifically include demodulation information such as physical layer resource information of a sidelink data channel, DMRS configuration information, a number of DMRS ports, an MCS, and a format of the second control information. The PSSCH may carry data information and the second control information. The second control information mainly carries control information other than the PSS CH DMRS, and may specifically include information such as CSI reporting trigger information, an IP of a target user of the PSSCH, a PSSCH HARQ process number, a new data indicator, and a HARQ transmission version number.

In addition, the overhead of the PTRS and/or the overhead of the CSI-RS may be an average number of REs occupied by the PTRS and/or the CSI-RS. The overhead of the first control information may be an average number of REs occupied by the first control information, or a number of REs occupied by the first control information. The overhead of the second control information may be an average number of REs occupied by the second control information. The average number of REs occupied by each of the PTRS and/or the CSI-RS, the first control information, and the second control information may also be referred to as a number of occupied REs.

In addition, the number of reference symbols for the PSSCH in the first time unit may be preconfigured, or may be configured by the network side device. The number of reference symbols for the PSSCH in the first time unit may be a number of symbols obtained by excluding the following symbols from the first time unit: a PSCCH symbol, a PSFCH symbol, an automatic gain control (AGC) symbol, and the last gap (GAP) symbol. The AGC symbol in the first time unit is the first Y symbols in the first time unit, where Y is a natural number, for example, 1, 2, or 3.

Specifically, if $N_{SC}^{PRB}$ represents the number of subcarriers in one PRB, $N_{sym}^{sh'}$ represents the number of reference symbols for the PSSCH in the first time unit, x represents the overhead of the PTRS and/or the overhead of the CSI-RS in one PRB, $M_{PSSCH}^{PRB}$ represents the number of PRBs included in the PSSCH, $N_{SCI1}$ represents the overhead of the first control information on the first time-frequency resource, and $N_{SCI2}$ represents the overhead of the second control information on the first time-frequency resource, the number of REs $N_{RE}$ on the first time-frequency resource that are for data transmission satisfies the following formula (3-6):

$$N_{RE}=N_{SC}^{PRB} \times N_{sym}^{sh'} \times M_{PSSCH}^{PRB} - N_{DMRS} - x \times M_{PSSCH}^{PRB} - N_{SCI1} - N_{SCI2} \quad (3\text{-}6)$$

Further, if a number of REs in one PRB that are used to determine the TBS has an upper limit, and Q represents the upper limit of the number of REs in one PRB that are used to determine the TBS, the number $\overline{N_{RE}}$ of REs on the first time-frequency resource that are for data transmission satisfies the following formula (3-7):

$$\overline{N_{RE}}=\min(Q^*M_{PSSCH}^{PRB}, N_{RE}) \quad (3\text{-}7)$$

$N_{RE}$ in the formula (3-7) satisfies the foregoing formula (1-3). Q is a positive integer. For example, Q may be equal to 132, 144, or 156. Alternatively, $Q=12^*(N_{sym}-a)$, where the value range of a is an integer such as 1, 2, or 3. $N_{sym}$ represents a number of symbols in the first time unit (which may also be referred to as a symbol length of the first time unit). a represents a symbol overhead in the first time unit, and the symbol overhead may include at least one of the AGC symbol, the last GAP symbol, or the like.

S403: Determine the TBS of the PSSCH based on the number of REs on the first time-frequency resource that are for data transmission.

Specifically, when the number of REs on the first time-frequency resource that are for data transmission is determined, the TBS of the PSSCH may be determined based on the number of REs on the first time-frequency resource that are for data transmission, and a comparison table between a modulation and code signal (MCS) and a target code rate. The comparison table between the MCS and the target code rate may be as shown in the following Table 1, and includes modulation orders, target code rates, and spectral efficiency that correspond to different MCS indexes.

It should be noted that the method for determining the TBS of the PSSCH in step S403 is consistent with a method for determining a TBS of a PSSCH in an existing NR system. For details, refer to descriptions of the related technologies. Details are not described herein in this embodiment of this application.

Optionally, the method may further include: The transmit end transmits a transport block based on the TBS. Correspondingly, the receive end receives the transport block based on the TBS, that is, the receive end performs channel decoding on the transport block.

In this embodiment of this application, for initial transmission or retransmission of data, both the transmit end and the receive end may first determine the second overhead of the PSSCH DMRS on the first time-frequency resource, and determine, based on the second overhead of the PSSCH DMRS, the number of REs on the first time-frequency resource that are for data transmission. The second overhead of the PSSCH DMRS is an average number of REs occupied by the PSSCH DMRS in a plurality of DMRS configurations, instead of an actual number of REs occupied by the PSSCH DMRS in one transmission. Therefore, for initial transmission and retransmission, the number of REs for data transmission remains unchanged, where the number of REs is determined based on the second overhead of the PSSCH DMRS, and the TBS determined based on the number of REs for data transmission is the same. Therefore, according to the method provided in this embodiment of this application, transport blocks for initial transmission and retransmission in a sidelink communication process can be combined, to achieve a combined gain.

In addition, in this application, the TBS is determined based on the number of REs for data transmission, where the number of REs is determined based on the average number of REs occupied by the PSSCH DMRS in the plurality of DMRS configurations on the first time-frequency resource. Therefore, in this embodiment of this application, the PSSCH may be allowed to carry different quantities of DMRS symbols in initial transmission and retransmission processes of one TBS. In addition, different quantities of DMRS symbols are set, so that when a signal to interference plus noise ratio (SINR) decreases, the PSSCH decoding efficiency may be improved by increasing the number of DMRS symbols, or when the SINR increases, the channel throughput of the PSSCH may be improved by decreasing the number of DMRS symbols.

In the solutions provided in FIG. 2 to FIG. 5, DMRS configurations of different quantities of DMRS symbols are supported in initial transmission and retransmission of a data packet. This can ensure that if a channel state changes in initial transmission and retransmission processes of data, the channel estimation accuracy can be improved by increasing a time domain density of demodulation reference signals, to ensure the transmission reliability. In this case, based on the solutions of this application, even if the number of DMRS symbols is variable, it can still be ensured that the number of REs allocated for the PSSCH remains unchanged, to ensure that transmission block sizes of data in initial transmission and retransmission remain unchanged. In this way, physical layer combination can be performed in a plurality of transmissions, to achieve a combined gain of transmission. Further, whether the PSSCH DMRS symbol overlaps the PSCCH in the PRB is considered, so that the number of REs allocated for the PSSCH can be further accurately estimated while the PSSCH DMRS can be mapped, a preset PSSCH transmission code rate is implemented, and a resource waste caused by an excessively low transmission code rate is reduced or the transmission unreliability caused by an excessively high code rate is eliminated.

FIG. 6 is a schematic flowchart of still another method for determining a transport block size according to an embodiment of this application. The method may be applied to a communication system including a transmit end and a receive end. The transmit end and the receive end may be two terminal devices that communicate with each other in a D2D manner. For example, the transmit end may be referred to as a first terminal device, and the receive end may be referred to as a second terminal device. The following describes each step in the method in detail.

S501: The first terminal device sends first indication information and/or second indication information to the second terminal device, where the first indication information indicates a scaling factor (expansion factor) of second control information, and the second indication information indicates an overhead of a PSSCH DMRS.

S502: The second terminal device receives the first indication information and/or the second indication information from the first terminal device, where the first indication information indicates the scaling factor of the second control information, and the second indication information indicates the overhead of the PSSCH DMRS.

In S501 and S502, the PSSCH may carry data information and the second control information. The second control information mainly carries control information other than the PSSCH DMRS, and may specifically include information such as CSI reporting trigger information, an IP of a target user of the PSSCH, a PSSCH HARQ process number, a new data indicator, and a HARQ transmission version number. The scaling factor of the second control information indicated by the first indication information may be used to determine an overhead of the second control information on the first time-frequency resource. The overhead of the second control information may be specifically a number of REs occupied by the second control information on the first time-frequency resource. The overhead of the PSSCH DMRS indicated by the second indication information may be specifically the overhead of the PSSCH DMRS on the first time-frequency resource, to be specific, an average number of REs occupied by the PSSCH DMRS on the first time-frequency resource.

In addition, the first time-frequency resource is a time-frequency resource for sidelink communication, and the time-frequency resource may include a time domain resource and a frequency domain resource. The first time-frequency resource may include the first time unit in time domain. The first time unit may include a plurality of symbols. The first time unit may be configured by a network side device. For example, the network side device may configure the first time unit by configuring the first start symbol in the plurality of symbols and the number of the plurality of symbols. The first time-frequency resource may include one subchannel or a plurality of continuous subchannels in frequency domain. Each subchannel may include a plurality of continuous PRBs in frequency domain. The one subchannel or the plurality of continuous subchannels may be configured by the network side device. For example, for any subchannel, the network side device may configure a sequence number of the first PRB in a plurality of PRBs included in the subchannel and a number of PRBs included in the subchannel. A PSSCH and the PSSCH DMRS may occupy one subchannel or a plurality of continuous subchannels, and a PSCCH may occupy a plurality of continuous PRBs in one subchannel. On the first time-frequency resource, the PSSCH DMRS and the PSCCH may overlap or may not overlap in time domain.

Optionally, the first indication information may be carried in the first control information, the second indication information may also be carried in the first control information, and the first control information is carried on the PSCCH. The first indication information may occupy at least one bit of the first control information. For example, the first indication information may be one bit (bit), or may be two bits (bits). Alternatively, the second indication information may occupy at least one bit of the first control information. For example, the second indication information may be one bit or two bits. Quantities of bits occupied by the first indication information and the second indication information are not specifically limited in this embodiment of this application. Optionally, the first indication information and the second indication information may alternatively be carried by using RRC. When there is only one DMRS time domain pattern configuration in a PSSCH DMRS configuration set, the second indication information may not exist.

The following separately describes indication methods of the first indication information and the second indication information.

For the first indication information, in an example embodiment, that the scaling factor of the second control information indicated by the first indication information is equal to a scaling factor $\beta$ carried in the first control information may also be understood as follows: The first indication information indicates to determine, based on the scaling factor $\beta$ carried in the first control information, the overhead of the second control information. Further, the first indication information may further indicate that scaling factors carried in the first control information in initial transmission and retransmission are the same.

Alternatively, that the scaling factor of the second control information indicated by the first indication information is equal to an average value $\bar{\beta}$ of at least one configured scaling factor may also be understood as follows: The first indication information indicates to determine the overhead of the second control information based on an average value $\bar{\beta}$ of the at least one configured scaling factor. Further, the first indication information may further indicate that scaling factors carried in the first control information in initial transmission and retransmission are different. The at least one scaling factor may include one or more scaling factors, and the at least one scaling factor may be configured by the network side device or preconfigured. For example, the at least one scaling factor may include four scaling factors, which are respectively represented as $\beta_1$, $\beta_2$, $\beta_3$, and $\beta_4$, and the average value $\bar{\beta}$ may be an average value of the four scaling factors (that is, $\beta_1$, $\beta_2$, $\beta_3$, and $\beta_4$).

For example, it is assumed that the first indication information is one bit. The value of the bit, namely, 0, may indicate that the scaling factors carried in the first control information in initial transmission and retransmission are the same, and the scaling factor of the second control information indicated by the first indication information is equal to the scaling factor $\beta$ carried in the first control information. The value of the one bit, namely, 1, may indicate that the scaling factors carried in the first control information in initial transmission and retransmission are different, and the scaling factor of the second control information indicated by the first indication information is equal to the average value $\bar{\beta}$ of the at least one scaling factor, and vice versa.

It should be noted that the average value $\bar{\beta}$ may be a ratio of the sum of the at least one scaling factor to the number of the at least one scaling factor, the average value $\bar{\beta}$ may be obtained by rounding up the ratio, or the average value $\bar{\beta}$ may be obtained by rounding down the ratio. This is not specifically limited in this embodiment of this application.

For the first indication information, in another example embodiment, the first indication information is the scaling factor $\beta'$ of the second control information. In other words, the first indication information explicitly indicates the scaling factor $\beta'$ of the second control information, and the first indication information may be specifically an index value of the scaling factor $\beta'$ of the second control information. Optionally, $\beta'$ is a positive integer, and $\beta'$ may be any scaling factor in a configured scaling factor set corresponding to the second control information, or $\beta'$ is greater than or equal to a smallest value in the scaling factor set and less than or equal to a largest value in the scaling factor set. The scaling factor set may be configured by the network side device or preconfigured, and the scaling factor set may include at least two scaling factors. For example, the scaling factor set may include four scaling factors, and may be specifically $\{\beta_1, \beta_2, \beta_3, \text{and } \beta_4\}$.

For example, it is assumed that the first indication information is two bits, and the scaling factor set is $\{\beta_1, \beta_2, \beta_3, \text{and } \beta_4\}$. If index values corresponding to the four scaling factors are sequentially 00, 01, 10, and 11, when the value of the two bits is 00, the first indication information specifically indicates that the scaling factor $\beta'$ of the second control information is $\beta_1$, when the value of the two bits is 01, the first indication information specifically indicates that the scaling factor $\beta'$ of the second control information is $\beta_2$, when the value of the two bits is 10, the first indication information specifically indicates that the scaling factor $\beta'$ of the second control information is $\beta_3$, or when the value of the two bits is 11, the first indication information specifically indicates that the scaling factor $\beta'$ of the second control information is $\beta_4$. Alternatively, it is assumed that the first indication information is three bits, the smallest value in the scaling factor set $\{\beta_1, \beta_2, \beta_3, \text{and } \beta_4\}$ is $\beta_1$ and the largest value is $\beta_4$, and a total of six positive integers are included from the smallest value $\beta_1$ to the largest value $\beta_4$. The six positive integers may each correspond to one three-bit index value. For example, the index values corresponding to the six positive integers may be sequentially 001, 010, 011, 100, 101, and 110. In this case, the first indication information may indicate a corresponding positive integer by using a different index value, and use the positive integer as the scaling factor $\beta'$ of the second control information.

For the second indication information, in an example embodiment, the second indication information indicates the overhead of the PSSCH DMRS that is determined based on the number of DMRS symbols carried in the first control information; or the second indication information indicates the overhead of the PSSCH DMRS (which may also be referred to as a second overhead, and the second overhead may be an average value of a plurality of first overheads) that is determined based on an overhead of the PSSCH DMRS (which may also be referred to as a first overhead or an average number of occupied REs) in at least one DMRS configuration.

For example, the second indication information is one bit. The value of the bit, namely, 0, may indicate the overhead of the PSSCH DMRS that is determined based on the number of DMRS symbols carried in the first control information. The value of the bit, namely, 1, may indicate the overhead of the PSSCH DMRS that is determined based on the overhead of the PSSCH DMRS in the at least one DMRS configuration.

The at least one DMRS configuration may be at least one DMRS configuration corresponding to the first time-frequency resource, and may be configured by the network side device or preconfigured for the first time-frequency resource. The at least one DMRS configuration may include one or more DMRS configurations. The specific number of DMRS symbols is correspondingly set in each DMRS configuration. The DMRS symbol may be occupied by a DMRS or used for transmitting a DMRS. For example, if the at least one DMRS configuration is {2, 3, 4}, the at least one DMRS configuration includes three DMRS configurations. The DMRS configuration of {2} indicates that the corresponding number of DMRS symbols is 2. The DMRS configuration of {3} indicates that the corresponding number of DMRS symbols is 3. The DMRS configuration of {4} indicates that the corresponding number of DMRS symbols is 4.

In addition, the overhead of the PSSCH DMRS in each DMRS configuration may be referred to as the first overhead of the PSSCH DMRS, and the overhead of the PSSCH DMRS determined based on the overhead of the PSSCH DMRS in at least one DMRS configuration may be referred to as the second overhead of the PSSCH DMRS. The second overhead of the PSSCH DMRS may be the average value of the first overheads of the PSSCH DMRS in the at least one DMRS configuration.

S503: The first terminal device determines a TBS of the PSSCH based on the scaling factor of the second control information and/or the overhead of the PSSCH DMRS. S503 is performed after S501, and there is no sequence between S503 and S502. To be specific, S503 may be performed after S502, or may be performed before S502. In FIG. 6, an example in which S503 is performed after S502 is used for description.

When the first terminal device sends the first indication information to the second terminal device, the first terminal device may determine the overhead of the second control information on the first time-frequency resource based on the scaling factor of the second control information indicated by the first indication information; and/or when the first terminal device sends the second indication information to the second terminal device, the first terminal device may determine the overhead of the PSSCH DMRS indicated by the second indication information. Then, the first terminal device may determine, based on the overhead of the second control information on the first time-frequency resource and/or the overhead of the PSSCH DMRS on the first time-frequency resource, the number of REs on the first time-frequency resource that are for data transmission, to determine the TBS of the PSSCH based on the number of REs for data transmission.

S504: The second terminal device determines a TBS of the PSSCH based on the scaling factor of the second control information and/or the overhead of the PSSCH DMRS. S504 is performed after S502, and there is no sequence between S504 and S503. To be specific, S504 may be performed after S503, or may be performed before S503. In FIG. 6, an example in which S504 is performed after S503 is used for description.

When the second terminal device receives the first indication information, the second terminal device may determine the scaling factor of the second control information based on the first indication information, and determine the overhead of the second control information on the first time-frequency resource based on the scaling factor of the second control information. When the second terminal device receives the second indication information, the second terminal device may determine, based on the second indication information, the overhead of the PSSCH DMRS indicated by the second indication information, that is, the overhead of the PSSCH DMRS on the first time-frequency resource. Then, the second terminal device may determine, based on the overhead of the second control information on the first time-frequency resource and/or the overhead of the PSSCH DMRS on the first time-frequency resource, the number of REs on the first time-frequency resource that are for data transmission, to determine the TBS of the PSSCH based on the number of REs for data transmission.

It should be noted that, in S503 and S504, the specific method for determining the TBS of the PSSCH based on the number of REs on the first time-frequency resource that are for data transmission is consistent with a method for determining a TBS of a PSSCH in an existing NR system. For details, refer to descriptions of the related technologies. Details are not described herein in this embodiment of this application.

Optionally, the method may further include: The first terminal device transmits a transport block based on the TBS. Correspondingly, the second terminal device receives the transport block based on the TBS, that is, the second terminal device performs channel decoding on the transport block.

In this embodiment of this application, when the DMRS configuration set corresponding to the first time-frequency resource includes different DMRS configurations of quantities of DMRS symbols, or there are a plurality of configurations of the scaling factor of the second control information, various configurations can be flexibly used in initial transmission and retransmission processes of the PSSCH. In addition, according to the method, when the transmit end and the receive end determine TBSs, it can be ensured that the determined overhead of the second control information and/or the overhead of the PSSCH DMRS are/is the same. Therefore, it can be ensured that the TBSs determined by the transmit end and the receive end are consistent. In addition, when the second indication information indicates the overhead of the PSSCH DMRS determined based on the overhead of the PSSCH DMRS in the at least one DMRS configuration, because the overhead of the PSSCH DMRS is the average number of REs occupied by the PSSCH DMRS in the at least one DMRS configuration rather than an actual number of REs occupied by the PSSCH DMRS in one transmission, for initial transmission and retransmission, TBSs determined based on the overhead of the PSSCH DMRS are the same. Therefore, according to the method provided in this embodiment of this application, transport blocks for initial transmission and retransmission in a sidelink communication process can be combined, to achieve a combined gain.

In addition, in this application, the TBS is determined based on the number of REs for data transmission, where the number of REs is determined based on the overhead of the PSSCH DMRS. Therefore, in this embodiment of this application, the PSSCH may be allowed to carry different quantities of DMRS symbols in initial transmission and retransmission processes of one TBS. In addition, different quantities of DMRS symbols are set, so that when a signal to interference plus noise ratio (SINR) decreases, the PSSCH decoding efficiency may be improved by increasing the number of DMRS symbols, or when the SINR increases, the channel throughput of the PSSCH may be improved by decreasing the number of DMRS symbols.

The technical solution provided in FIG. 6 supports the transmit end in notifying, by using the first control information or RRC configuration information, the receive end of the method for determining the overhead of the PSSCH DMRS. To be specific, the method is about whether the overhead of the PSSCH DMRS is determined based on a number of REs used by a DMRS this time, or is determined based on all DMRS configurations in the DMRS configuration set. In this way, the transmit end can freely select the overhead of the PSSCH DMRS. Considering different channel states of PSSCH links, different DMRS configurations may be configured in a resource pool to ensure the decoding reliability. When two communication parties are close to each other and a channel condition is good, an overhead of a PSSCH DMRS of the two communication parties may be fixed at a small value (for example, a DMRS configuration including two DMRS symbols). If the overhead of the PSSCH DMRS is determined based on all the DMRS configurations in the DMRS configuration set, the number of REs actually allocated for the PSSCH is relatively small. This application supports the transmit end in notifying the receive end of the method for determining the overhead of the PSSCH DMRS, so that the transmit end can freely select the overhead of the PSSCH DMRS. Similar to the PSSCH DMRS, the scaling factor of the second control information on the PSSCH also has a plurality of configurations. Specifically, the transmit end indicates, in the first control information carried in one data transmission, the scaling factor specifically used by the second control information. Considering that channel states in initial transmission and retransmission are different, the value of the scaling factor of the second control information carried in the first control information may be scaled based on the channel states. When the channel condition deteriorates, the value of the scaling factor is increased, so that a transmission code rate of the second control information is reduced, and the transmission reliability of the second control information is improved. When the channel condition improves, the value of the scaling factor is decreased, so that the number of REs occupied by the second control information is reduced, the number of REs occupied by the PSSCH is increased, and the system throughput is further improved.

FIG. 7 is a schematic flowchart of a method for determining a PSSCH DMRS symbol according to an embodiment of this application. The method may be applied to a transmit end, or may be applied to a receive end. The transmit end and the receive end may be two terminal devices that communicate with each other in a D2D manner. For example, the transmit end may be referred to as a first terminal device, and the receive end may be referred to as a second terminal device. The following describes each step in the method in detail.

S601: Determine, based on a number of DMRS symbols for a PSSCH DMRS on a first time-frequency resource and a number of reference symbols for a PSSCH, a symbol mapping position of the PSSCH DMRS on the first time-frequency resource.

The first time-frequency resource is a time-frequency resource for sidelink communication, and the time-frequency resource may include a time domain resource and a frequency domain resource. The first time-frequency resource may include the first time unit in time domain. The first time unit may include a plurality of symbols. The first time unit may be configured by a network side device. For example, the network side device may configure the first time unit by configuring the first start symbol in the plurality of symbols and the number of the plurality of symbols. The first time-frequency resource may include one subchannel or a plurality of continuous subchannels in frequency domain. Each subchannel may include a plurality of continuous PRBs in frequency domain. The one subchannel or the plurality of continuous subchannels may be configured by the network side device. For example, for any subchannel, the network side device may configure a sequence number of the first PRB in a plurality of PRBs included in the subchannel and a number of PRBs included in the subchannel. A PSSCH and the PSSCH DMRS may occupy one subchannel or a plurality of continuous subchannels, and a PSCCH may occupy a plurality of continuous PRBs in one subchannel. On the first time-frequency resource, the PSSCH DMRS and the PSCCH may overlap or may not overlap in time domain.

In addition, the number of DMRS symbols for the PSSCH DMRS on the first time-frequency resource may be a number of symbols occupied by the PSSCH DMRS on the first time-frequency resource, or a number of symbols on the first time-frequency resource to which the PSSCH DMRS is mapped. The number of DMRS symbols may be configured by the network side device or preconfigured, and the first terminal device includes, in the first control information, a number of DMRS symbols for sending data this time. For example, the number of DMRS symbols for the PSSCH DMRS on the first time-frequency resource may be 2, 3, 4, or the like. This is not specifically limited in this embodiment of this application.

In addition, the number of reference symbols may be a number of symbols obtained by excluding the following symbol overheads from the first time unit, that is, a number of symbols obtained by subtracting the following symbol overheads from the number of symbols in the first time unit: a PSCCH symbol overhead, a PSFCH symbol overhead, an AGC symbol overhead, and the last GAP symbol overhead in the first time unit. The AGC symbol is the first Y symbols in the first time unit, where Y is a natural number, for example, 1, 2, or 3.

The number of symbols in the first time unit may be configured by the network side device or preconfigured. Alternatively, the symbol overhead of the PSCCH may be configured by the network side device or preconfigured. The symbol overhead of the PSFCH is related to feedback configuration periodicity information of the PSFCH. For the symbol overhead of the PSFCH, if a feedback configuration period of the PSFCH is represented as W, and a number of symbols included in the PSFCH and a guard interval of the PSFCH is represented as Z, the symbol overhead $N_{sym}^{PSFCH}$ of the PSFCH satisfies the following condition: When W is not 0, $N_{sym}^{PSFCH}=Z/W$ and Z=3, or $N_{sym}^{PSFCH}=\lceil Z/W \rceil$, where $\lceil \ \rceil$ represents rounding up; or when W is 0, $N_{sym}^{PSFCH}=0$.

Optionally, the number of reference symbols may be configured by the network side device or preconfigured. For example, the number of reference symbols may be preconfigured in a resource pool to which the first time-frequency resource belongs. Alternatively, the number of reference symbols is determined by first configuration information, and the first configuration information includes at least one of the following: the number of symbols in the first time unit, the feedback configuration periodicity information of the PSFCH, the number of symbols included in the PSFCH and the guard interval of the PSFCH, and a relationship between a number of PRBs included in the PSSCH and a number of PRBs included in the PSCCH. The relationship between the number of PRBs included in the PSSCH and the number of PRBs included in the PSCCH may specifically include: The number of PRBs included in the PSSCH is equal to or not equal to the number of PRBs included in the PSCCH. The relationship between the number of PRBs included in the PSSCH and the number of PRBs included in the PSCCH may also be understood as a relationship between a bandwidth of the PSSCH and a bandwidth of the PSCCH, that is, the bandwidth of the PSSCH is equal to or not equal to the bandwidth of the PSCCH.

In an example embodiment, when the number of PRBs included in the PSSCH is not equal to the number of PRBs included in the PSCCH, if $N_{sym}^{sh}$ indicates the number of last gap symbols and/or AGC symbols excluded from the first time unit, and $N_{sym}^{PSFCH}$ indicates the symbol overhead of the PSFCH, the number of reference symbols $N_{sym}^{sh'}$ satisfies the following formula (3-1):

$$N_{sym}^{sh'}=N_{sym}^{sh}-N_{sym}^{PSFCH} \quad (3\text{-}1)$$

The AGC symbol is the first Y symbols in the first time unit, where Y is a natural number, for example, 1, 2, or 3. For example, when the number of PRBs included in the PSSCH is not equal to the number of PRBs included in the PSCCH, the number of reference symbols is affected by the symbol overhead of the PSFCH. The symbol overhead of the PSFCH herein is the total number of symbols occupied by the PSFCH and the guard interval of the PSFCH. Correspondingly, a relative position $\bar{l}$ of the PSSCH DMRS in the first time unit is determined according to the following Table 3 based on the number $N_{sym}^{sh'}$ of reference symbols, the symbol number of the PSCCH, and the number of PSSCH DMRS symbols, carried in the first control information, for sending data this time. Finally, it is determined that a symbol mapping position of the PSSCH DMRS in a slot is $l_{sym}^{start}+\bar{l}$, where $l_{sym}^{start}$ represents a start symbol position of the first time unit. The relative position of the PSSCH DMRS in the first time unit may be a symbol position of a DMRS symbol for the PSSCH DMRS in the first time unit relative to the start symbol position.

TABLE 3

| | DM-RS position $\bar{l}$ | | | | | |
|---|---|---|---|---|---|---|
| | PSCCH duration 2 symbols Number of PSSCH DM-RS | | | PSCCH duration 3 symbols Number of PSSCH DM-RS | | |
| $N_{sym}^{sh'}$ in symbols | 2 | 3 | 4 | 2 | 3 | 4 |
| 6 | 1, 5 | | | 1, 5 | | |
| 7 | 1, 5 | | | 1, 5 | | |
| 8 | 1, 5 | 1, 4, 7 | | 1, 5 | 1, 4, 7 | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

It should be noted that Table 3 shows a relative position of the PSSCH DMRS symbol in the first time unit according to this embodiment of this application. In Table 3, $N_{sym}^{sh'}$ in symbols indicates the number of reference symbols for the PSSCH, DM-RS position $\bar{l}$ indicates a relative position of a DMRS symbol for the PSSCH DMRS in the first time unit, PSCCH duration 2 symbols indicates that a symbol overhead of the PSCCH is two symbols, PSCCH duration 3 symbols indicate that a symbol overhead of the PSCCH is three symbols, and Number of PSSCH DM-RS indicates a symbol overhead of the PSSCH DMRS.

Figure 8:
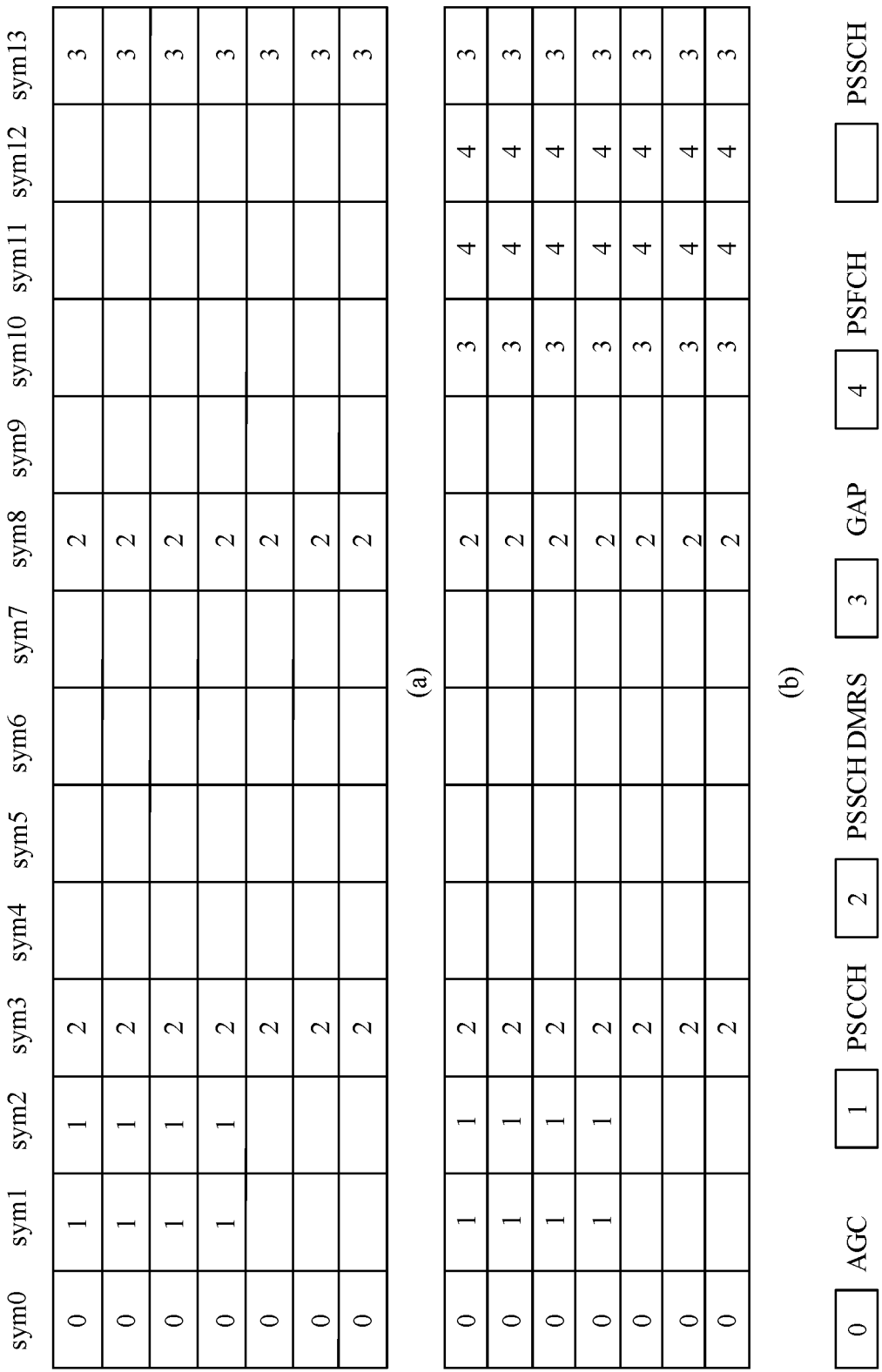
FIG. 8 is a schematic diagram of another first time-frequency resource according to an embodiment of this application.

As shown in (a) in FIG. 8, the first time unit includes 14 symbols. In other words, the first time unit includes symbols from sym0 to sym13 in one slot. When a configuration period W of the PSFCH is 0, to be specific, frame structures of all sidelinks are as shown in (a) in FIG. 8, the symbol overhead of the PSFCH is 0, and the number of reference symbols is obtained by excluding the last gap symbol and Y AGC symbols from the first time unit, where Y=1. It may be determined, based on the foregoing parameters, that the number $N_{sym}^{sh'}$ of reference symbols is 12. When a configuration period W of the PSFCH is 2, to be specific, the symbol overhead of the PSFCH is $\lceil 3/W \rceil=\lceil 3/2 \rceil=2$, when frame structures of sidelinks are as shown in (a) and (b) in FIG. 8, the number of reference symbols is obtained by subtracting the last gap symbol and Y AGC symbols, and the symbol overhead of the PSFCH from the first time unit, where Y=1. It may be determined, based on the foregoing parameters, that the number $N_{sym}^{sh'}$ of reference symbols is 10. Assuming that the symbol number of the PSCCH is 2, it can be learned from Table 3 that there are two PSSCH DMRS time domain patterns whose number $N_{sym}^{sh'}$ of reference symbols is 10, that is, {3, 8} and {1, 4, 7}. When the number, of time domain symbols for the PSSCH DMRS, indicated by the first control information is 2, the relative position Ī is 3 and 8; or when the number, of time domain symbols for the PSSCH DMRS, indicated by the first control information is 3, the relative position Ī is 1, 4, and 7. Because the first time unit of the sidelink occupies all 14 symbols in the slot, the configured start symbol position $1_{sym}^{start}$ is 0. When the symbol number of the PSCCH is 2, the relative position Ī is 3 and 8, that is, the symbol mapping position $1_{sym}^{start}+\bar{I}$ of the PSSCH DMRS in a slot is sym3 and sym8. It should be noted that there may be one or more AGC symbols, and one AGC symbol is used as an example for description in FIG. 8.

In another example embodiment, when the number of PRBs included in the PSSCH is the same as the number of PRBs included in the PSCCH, if $N_{sym}^{sh}$ represents the number of GAP symbols and AGC symbols excluded from the first time unit, $N_{sym}^{PSFCH}$ represents the symbol overhead of the PSFCH, and $N_{sym}^{PSCCH}$ represents the symbol overhead of the PSCCH, the number of reference symbols $N_{sym}^{sh'}$ satisfies the following formula (3-2):

$$N_{sym}^{sh'}=N_{sym}^{sh}-N_{sym}^{PSFCH}-N_{sym}^{PSCCH} \quad (3\text{-}2)$$

The AGC symbol is the first Y symbols in the first time unit, where Y is a natural number, for example, 1, 2, or 3.

For example, when the number of PRBs included in the PSSCH is equal to the number of PRBs included in the PSCCH, the number of reference symbols is affected by the symbol overhead of the PSFCH and the symbol overhead of the PSCCH. Correspondingly, the relative position Ī of the PSSCH DMRS in the first time unit is determined according to the foregoing Table 3 based on the number $N_{sym}^{sh'}$ of reference symbols, the symbol number of the PSCCH, and the number of PSSCH DMRS symbols, carried in the first control information, for sending data this time. Finally, it is determined that a symbol mapping position of the PSSCH DMRS in a slot is $1_{sym}^{start}+N_{sym}^{PSCCH}+\bar{I}$, where $1_{sym}^{start}$ represents a start symbol position of the first time unit.

The relative position of the PSSCH DMRS in the first time unit may be a symbol position of a DMRS symbol for the PSSCH DMRS in the first time unit relative to the start symbol position.

Figure 9:
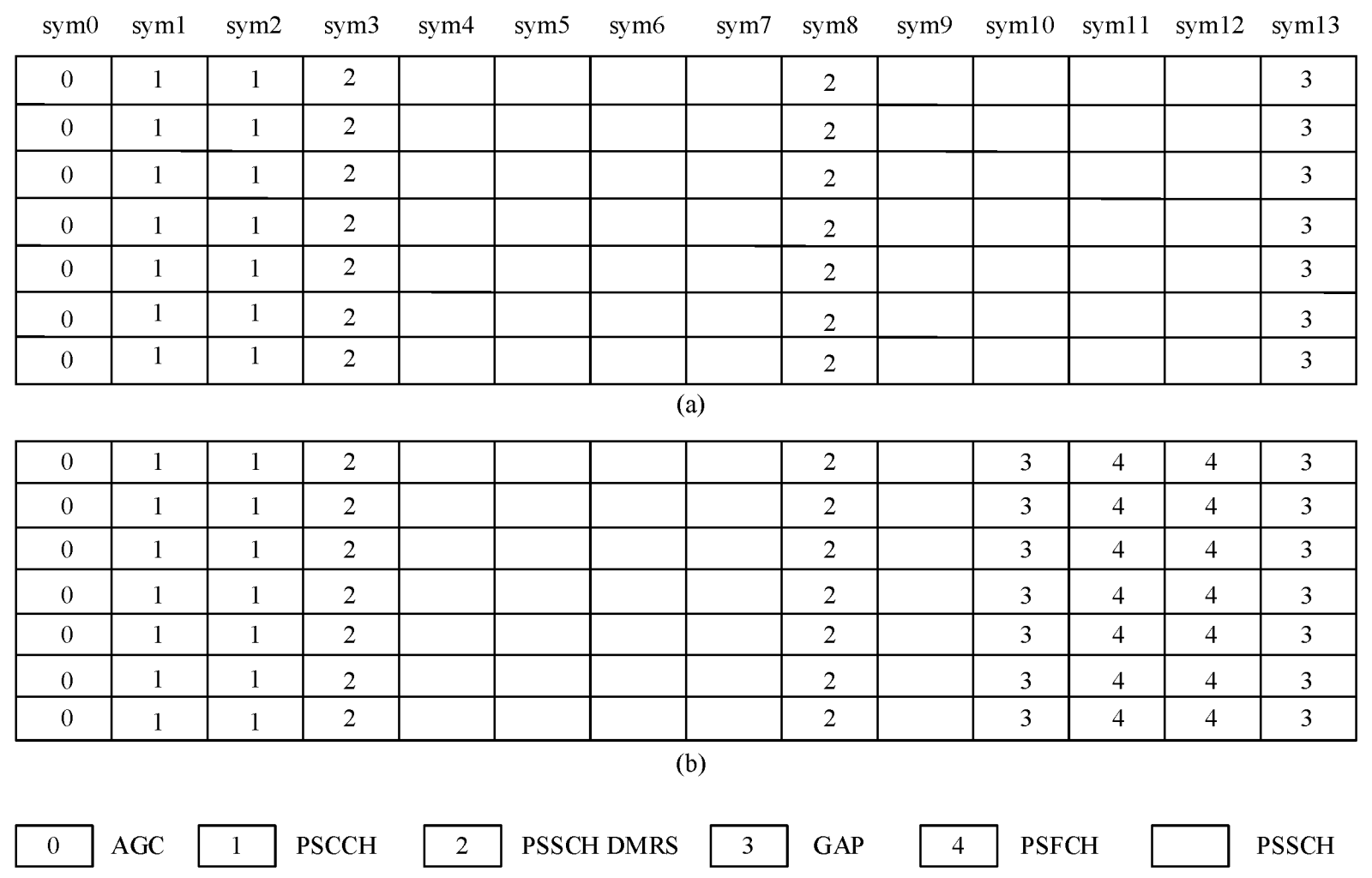

As shown in (a) in FIG. 9, the first time unit includes 14 symbols, that is, includes symbols from sym0 to sym13 in a slot. When a configuration period W of the PSFCH is 0, to be specific, frame structures of all sidelinks are as shown in (a) in FIG. 9, the symbol overhead of the PSFCH is 0. In addition, when the symbol overhead of the PSCCH is 2, the number of reference symbols is obtained by excluding the last gap symbol and the AGC symbol (where the number, Y, of the AGC symbols in the first time unit is equal to 1), and the symbol overhead of the PSCCH from the first time unit. It is determined, based on the foregoing parameters, that the number of reference symbols is 10. When a configuration period W of the PSFCH is 2, to be specific, the symbol overhead of the PSFCH is ⌈3/W⌉=⌈3/2⌉=2, when frame structures of sidelinks are as shown in (a) and (b) in FIG. 9, and the symbol overhead of the PSCCH is 2, the number of reference symbols is obtained by excluding the last gap symbol and one AGC symbol (Y=1), and the symbol overhead of the PSFCH and the symbol overhead of the PSCCH from the first time unit. It is determined, based on the foregoing parameters, that the number of reference symbols is 8. It can be learned from Table 3 that when the symbol number of the PSCCH is 2, there is only one PSSCH DMRS time domain pattern whose number $N_{sym}^{sh'}$ of reference symbols is 8, that is, {1, 5}. In other words, the symbol number of the PSSCH DMRS is 2, and the relative position Ī is 1 and 5. Because the first time unit of the sidelink occupies all 14 symbols in the slot, the configured start symbol position $1_{sym}^{start}$ is 0. When the symbol number of the PSCCH is 2, the relative position Ī is 1 and 5, that is, the symbol mapping position $1_{sym}^{start}+N_{sym}^{PSCCH}+\bar{I}$ of the PSSCH DMRS in one slot are sym3 and sym8. It should be noted that there may be one or more AGC symbols, and one AGC symbol is used as an example for description in FIG. 9.

Optionally, when the symbol mapping position of the PSSCH DMRS exceeds the symbols included in the PSSCH, the PSSCH DMRS is not mapped to the exceeded symbol mapping position. For example, when a configuration period W of the PSFCH is 4, to be specific, the symbol overhead of the PSFCH is ⌈3/W⌉=⌈3/4⌉=1, the number of PSSCH reference symbols for sidelinks as shown in (a) and (b) in FIG. 8 is a number of symbols obtained by subtracting the last gap symbol and Y AGC symbols, and the symbol overhead of the PSFCH from the first time unit, where Y=1. It is determined, based on the foregoing parameters, that the number of reference symbols is 11. In this case, when the number, of time domain symbols for the PSSCH DMRS, indicated by the first control information is 4, the relative position Ī is 1, 4, 7, and 11. Because the first time unit of the sidelink occupies all 14 symbols in the slot, the configured start symbol position $1_{sym}^{start}$ is 0. In other words, the symbol mapping position $1_{sym}^{start}+\bar{I}$ of the PSSCH DMRS in a slot is sym1, sym4, sym7, and sym11. For a slot as shown in (a) in FIG. 8, a PSSCH DMRS may be mapped to sym1, sym4, sym7, and sym11. However, for a slot as shown in (b) in FIG. 8, a PSSCH DMRS may be mapped to sym1, sym4, and sym7. However, because a PSFCH occupies some symbols, the PSSCH DMRS cannot be mapped to sym11. Therefore, the PSSCH DMRS is not mapped to sym11, or the PSSCH DMRS of sym11 is punctured, or the PSSCH DMRS of sym11 is no longer mapped.

Further, the symbol mapping position of the PSSCH DMRS on the first time-frequency resource is further related to the symbol overhead of the PSCCH. Optionally, the symbol overhead of the PSCCH is 2, that is, the PSCCH occupies two symbols in the first time unit; or the symbol overhead of the PSCCH is 3, that is, the PSCCH occupies three symbols in the first time unit.

In this embodiment of this application, for initial transmission or retransmission of data, both the transmit end and the receive end may determine the symbol mapping position of the PSSCH DMRS on the first time-frequency resource based on the number of DMRS symbols for the PSSCH DMRS on the first time-frequency resource and the number of reference symbols for the PSSCH, so that the transmit end and the receive end can quickly and efficiently determine the symbol mapping position of the PSSCH DMRS. In addition, the symbol mapping position of the PSSCH DMRS in a slot may be the start symbol position of the first time unit or the relative position of the DMRS symbol for the PSSCH DMRS in the first time unit. In this case, the symbol mapping position of the PSSCH DMRS in a slot can start from the first symbol position, so that the decoding efficiency is greatly improved.

The solution provided in FIG. 7 supports determining the symbol mapping position of the PSSCH DMRS based on the number of reference symbols for the PSSCH in the first time unit. In the prior art, a symbol mapping position of a PSSCH DMRS is determined based on a total number of symbols included in the PSSCH and the PSCCH, which causes two problems. The first problem is that when the PSSCH and the PSCCH include the same number of PRBs, the PSSCH DMRS symbol determined based on the total number of symbols for the PSSCH and the PSCCH cannot be used for mapping. The second problem is that due to the presence of a PSFCH channel, total quantities of symbols for the PSSCH and the PSCCH in different first time units are different. Consequently, overheads of PSSCH DMRSs are different in a process of calculating a TBS in initial transmission and retransmission of data. Consequently, TBS sizes are different, and retransmission combination cannot be performed. In this embodiment of this application, the symbol mapping position of the PSSCH DMRS is determined based on the number of reference symbols for the PSSCH. Because a number of PSFCH symbols and a number of PSCCH symbols are fixedly configured in a resource pool and are information known to both a receive end and a transmit end, the number of reference symbols for the PSSCH defined in this application is a parameter determined by excluding a number of symbols occupied by a PSFCH from a number of symbols in the first time unit, excluding an AGC symbol and the last GAP symbol in the first time unit, and excluding a number of PRBs included in a PSCCH based on a relationship between a number of PRBs included in the PSSCH and the number of PRBs included in the PSCCH. In this way, in one aspect, it can be ensured that an existing PSSCH DMRS time domain pattern configuration table can work when a bandwidth of the PSSCH is the same as that of the PSCCH, and in another aspect, it is ensured that a use scenario of the number of symbols included in the PSSCH DMRS time domain pattern is not affected by the presence of the PSFCH.

The foregoing mainly describes, from the perspective of the terminal device, the solutions provided in the embodiments of this application. It may be understood that to implement the foregoing functions, the terminal device (for example, the first terminal device or the second terminal device) includes a corresponding hardware structure and/or software module for performing each function. A person of ordinary skill in the art should easily be aware that, in combination with the examples described in embodiments disclosed in this specification, network elements, algorithms and steps in this application may be implemented by hardware or a combination of hardware and computer software. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

In the embodiments of this application, the terminal device may be divided into functional modules based on the foregoing method examples. For example, functional modules corresponding to various functions may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 10:
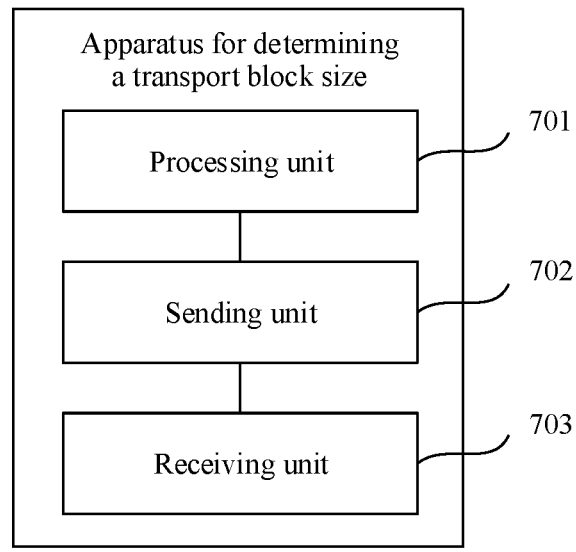
FIG. 10 is a schematic structural diagram of an apparatus for determining a transport block size according to an embodiment of this application.

When an integrated unit is used, FIG. 10 is an example schematic structural diagram of an apparatus for determining a transport block size according to an embodiment of this application. The apparatus may be used as a terminal device or a built-in chip of the terminal device. The terminal device may be a first terminal device or a second terminal device. The apparatus includes a processing unit 701. Further, the apparatus further includes a sending unit 702 and a receiving unit 703.

In an example implementation, the processing unit 701 may be configured to support the apparatus in performing S201, S202, and S203 in the foregoing method embodiment, and/or another process of the technology described in this specification. Further, when the apparatus is the first terminal device or a built-in chip of the first terminal device, the sending unit 702 may be configured to support the apparatus in sending information to the second terminal device or a network side device. For example, the sending unit 702 may be configured to support the apparatus in sending, based on the TBS determined in S203, a transport block to the second terminal device. When the apparatus is the second terminal device or a built-in chip of the second terminal device, the receiving unit 703 may be configured to support the apparatus in receiving information from the first terminal device or the network side device. For example, the receiving unit 703 may be configured to support the apparatus in receiving, based on the TBS determined in S203, a transport block from the first terminal device, and the sending unit 702 may be configured to support the apparatus in sending information to the second terminal device or the network side device.

In another example implementation, the processing unit 701 may be configured to support the apparatus in performing S301, S302, and S303 in the foregoing method embodiment, and/or another process of the technology described in this specification. Further, when the apparatus is the first terminal device or a built-in chip of the first terminal device, the sending unit 702 may be configured to support the apparatus in sending information to the second terminal device or the network side device, for example, sending a transport block to the second terminal device based on the TBS determined in S303. When the apparatus is the second terminal device or a built-in chip of the second terminal device, the sending unit 702 may be configured to support the apparatus in sending information to the first terminal device or the network side device, and the receiving unit 703 may be configured to support the apparatus in receiving information from the first terminal device or the network side device. For example, the receiving unit 703 may be configured to support the apparatus in receiving, based on the TBS determined in S303, a transport block from the first terminal device.

In still another example implementation, the processing unit 701 may be configured to support the apparatus in performing S400, S401, S402, and S403 in the foregoing method embodiment, and/or another process of the technology described in this specification. Further, when the apparatus is the first terminal device or a built-in chip of the first terminal device, the sending unit 702 may be configured to support the apparatus in sending information to the second terminal device or the network side device, for example, sending a transport block to the second terminal device based on the TBS determined in S403. When the apparatus is the second terminal device or a built-in chip of the second terminal device, the sending unit 702 may be configured to support the apparatus in sending information to the first terminal device or the network side device, and the receiving unit 703 may be configured to support the apparatus in receiving information from the first terminal device or the network side device. For example, the receiving unit 703 may be configured to support the apparatus in receiving, based on the TBS determined in S403, a transport block from the first terminal device.

In another example implementation, when the apparatus is the first terminal device or a built-in chip of the first terminal device, the sending unit 702 may be configured to support the apparatus in performing S501 in the foregoing method embodiment, and the processing unit 701 may be configured to support the apparatus in performing S503 in the foregoing method embodiment and/or another process of the technology described in this specification. Further, the sending unit 702 may be further configured to send a transport block to the second terminal device based on the TBS determined in S503. When the apparatus is the second terminal device or a built-in chip of the second terminal device, the receiving unit 703 may be configured to support the apparatus in performing S502 in the foregoing method embodiment, and the processing unit 701 may be configured to support the apparatus in performing S504 in the foregoing method embodiment and/or another process of the technology described in this specification. Further, the receiving unit 703 may be further configured to receive, based on the TBS determined in S504, a transport block sent by the first terminal device.

In another example implementation, the processing unit 701 may be configured to support the apparatus in performing S601 in the foregoing method embodiment, and/or another process of the technology described in this specification. Further, when the apparatus is the first terminal device or a built-in chip of the first terminal device, the sending unit 702 may be configured to support the apparatus in sending information to the second terminal device or the network side device, and the receiving unit 703 may be configured to support the apparatus in receiving the information from the second terminal device or the network side device. When the apparatus is the second terminal device or a built-in chip of the second terminal device, the receiving unit 703 may be configured to support the apparatus in receiving information from the first terminal device or the network side device, and the sending unit 702 may be configured to support the apparatus in sending information to the first terminal device or the network side device.

It should be noted that all related content of the steps in the foregoing method embodiments may be cited in function description of corresponding functional modules. Details are not described herein again.

Based on hardware implementation, the processing unit 701 in this embodiment of this application may be a processor of the apparatus, the sending unit 702 may be a transmitter of the apparatus, and the receiving unit 703 may be a receiver of the apparatus. The transmitter and the receiver may be usually integrated together to serve as a transceiver. Specifically, the transceiver may also be referred to as a communication interface.

Figure 11:
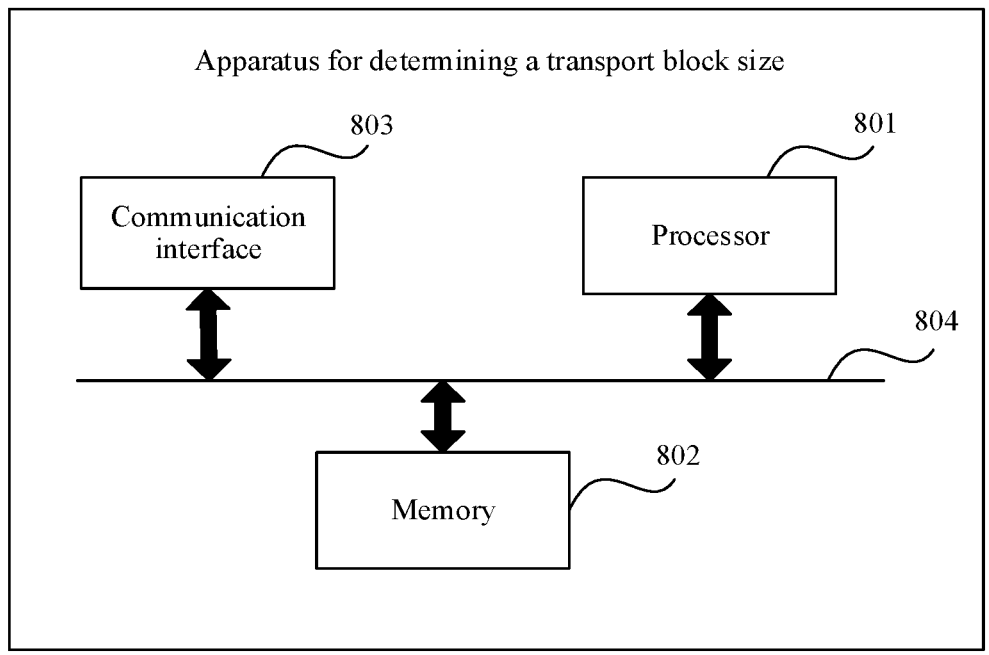
FIG. 11 is a schematic structural diagram of another apparatus for determining a transport block size according to an embodiment of this application.

FIG. 11 is another example schematic structural diagram of an apparatus for determining a transport block size in the foregoing embodiments according to an embodiment of this application. The apparatus may be used as a terminal device or a built-in chip of the terminal device. The terminal device may be a first terminal device or a second terminal device. The apparatus includes a processor 801, and may further include a memory 802, a communication interface 803, and a bus 804. The processor 801, the memory 802, and the communication interface 803 are connected by using the bus 804.

The processor 801 is configured to control and manage an action of the apparatus. In an example implementation, the processor 801 may be configured to support the apparatus in performing S201, S202, and S203 in the foregoing method embodiment, and/or another process of the technology described in this specification. In an example implementation, the processor 801 may be configured to support the apparatus in performing S301, S302, and S303 in the foregoing method embodiment, and/or another process of the technology described in this specification. In still another example implementation, the processor 801 may be configured to support the apparatus in performing S400, S401, S402, and S403 in the foregoing method embodiment, and/or another process of the technology described in this specification. In another example implementation, when the apparatus is the first terminal device or a built-in chip of the first terminal device, the processor 801 may be configured to support the apparatus in performing S503 in the foregoing method embodiment; or when the apparatus is the second terminal device or a built-in chip of the second terminal device, the processor 801 may be configured to support the apparatus in performing S504 in the foregoing method embodiment. In still another example implementation, the processor 801 may be configured to support the apparatus in performing S601 in the foregoing method embodiment, and/or another process of the technology described in this specification.

In addition, the communication interface 803 is configured to support communication of the apparatus. In an example implementation, when the apparatus is the first terminal device or a built-in chip of the first terminal device, the communication interface 803 may be configured to support the apparatus in communicating with a network side device or the second terminal device. In another example implementation, when the apparatus is the second terminal device or a built-in chip of the second terminal device, the communication interface 803 may be configured to support the apparatus in communicating with a network side device or the first terminal device. The memory 802 is configured to store program code and data of the apparatus.

In this application, the processor 801 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 804 in FIG. 11 may be a peripheral component interconnect (PCI) bus, an extended industry standard architecture (EISA) bus, and the like. The bus may be classified into an address bus, a data bus, a control bus, and the like. For ease of representation, only one thick line is used to represent the bus in FIG. 11, but this does not mean that there is only one bus or only one type of bus.

Based on this, an embodiment of this application further provides a communication system. The communication system includes a network device, a first terminal device, and a second terminal device. The first terminal device is the apparatus for determining a transport block size provided in FIG. 10 or FIG. 11, and is configured to perform the steps of the first terminal device in the method embodiment shown in FIG. 2, FIG. 4, FIG. 5, FIG. 6, or FIG. 7. The second terminal device is the apparatus for determining a transport block size provided in FIG. 10 or FIG. 11, and is configured to perform the steps of the second terminal device in the method embodiment shown in FIG. 2, FIG. 4, FIG. 5, FIG. 6, or FIG. 7.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a readable storage medium. The readable storage medium may include: any medium that can store program code, such as a USB flash drive, a removable hard disk drive, a read-only memory, a random access memory, a magnetic disk, or an optical disc. Based on such an understanding, the technical solutions in the embodiments of this application essentially, or a part contributing to a current technology, or all or a part of the technical solutions may be implemented in a form of a software product.

According to still another aspect of this application, a computer-readable storage medium is provided. The computer-readable storage medium stores instructions, and when the instructions are run on a device, the device is enabled to perform the steps in the method embodiment shown in FIG. 2.

According to still another aspect of this application, a computer-readable storage medium is provided. The computer-readable storage medium stores instructions, and when the instructions are run on a device, the device is enabled to perform the steps in the method embodiment shown in FIG. 4.

According to still another aspect of this application, a computer-readable storage medium is provided. The computer-readable storage medium stores instructions, and when the instructions are run on a device, the device is enabled to perform the steps in the method embodiment shown in FIG. 5.

According to still another aspect of this application, a computer-readable storage medium is provided. The computer-readable storage medium stores instructions, and when the instructions are run on a device, the device is enabled to perform the steps of the first terminal device in the method embodiment shown in FIG. 6. According to still another aspect of this application, a computer-readable storage medium is provided. The computer-readable storage medium stores instructions, and when the instructions are run on a device, the device is enabled to perform the steps of the second terminal device in the method embodiment shown in FIG. 6.

According to still another aspect of this application, a computer-readable storage medium is provided. The computer-readable storage medium stores instructions, and when the instructions are run on a device, the device is enabled to perform the steps in the method embodiment shown in FIG. 7.

According to still another aspect of this application, a computer program product is provided. When the computer program product runs on a device, the device is enabled to perform the steps in the method embodiment shown in FIG. 2.

According to still another aspect of this application, a computer program product is provided. When the computer program product runs on a device, the device is enabled to perform the steps in the method embodiment shown in FIG. 4.

According to still another aspect of this application, a computer program product is provided. When the computer program product runs on a device, the device is enabled to perform the steps in the method embodiment shown in FIG. 5.

According to still another aspect of this application, a computer program product is provided. When the computer program product runs on a device, the device is enabled to perform the steps of the first terminal device in the method embodiment shown in FIG. 6. According to still another aspect of this application, a computer program product is provided. When the computer program product runs on a device, the device is enabled to perform the steps of the second terminal device in the method embodiment shown in FIG. 6.

According to still another aspect of this application, a computer program product is provided. When the computer program product runs on a device, the device is enabled to perform the steps in the method embodiment shown in FIG. 7.

The foregoing descriptions are merely example implementations of this application, but are not intended to limit the protection scope of this application. Any variation or replacement within the technical scope disclosed in this application may fall within the protection scope of this application.

What is claimed is:

1. A method, comprising:
    determining, by an apparatus, an overhead of a physical sidelink shared channel demodulation reference signal (PSSCH DMRS) in a physical resource block (PRB) of a first time-frequency resource, wherein the PSSCH DMRS is for demodulating a physical sidelink shared channel (PSSCH); and
    determining, by the apparatus, based on the overhead of the PSSCH DMRS, a number of resource elements (REs) on the first time-frequency resource that are allocated for the PSSCH, wherein the number of REs is for determining a transport block size (TBS) of the PSSCH;
    wherein determining the overhead of the PSSCH DMRS is based on a demodulation reference signal (DMRS) configuration set, wherein the DMRS configuration set comprises one or more DMRS time domain pattern configurations, wherein each DMRS time domain pattern configuration indicates a specific number of DMRS symbols, wherein the DMRS configuration set is in a resource pool to which the first time-frequency resource belongs, and wherein the overhead $N_{DMRS}^{PRB}$ of the PSSCH DMRS satisfies:

| DMRS configuration set | $N_{DMRS}^{PRB}$ |
|---|---|
| {2} | 12 |
| {3} | 18 |
| {4} | 24 |
| {2, 3} | 15 |
| {2, 4} | 18 |
| {3, 4} | 21 |
| {2, 3, 4} | 18. |

2. The method according to claim 1, wherein the DMRS configuration set is configured by a network side device or preconfigured.

3. The method according to claim 1, wherein the resource pool is a set of time resources and frequency resources for sidelink communication.

4. The method according to claim 1, wherein the number of REs on the first time-frequency resource that are allocated for the PSSCH is further related to at least one of the following:
   a number of subcarriers in one PRB;
   a number of reference symbols for the PSSCH in one PRB in a first time unit, wherein the first time unit is a time domain length of the first time-frequency resource;
   an overhead of a phase tracking reference signal (PTRS) and/or an overhead of a channel state information reference signal (CSI-RS) in one PRB;
   a number of PRBs comprised in the PSSCH, wherein the number of PRBs comprised in the PSSCH is the same as a number of PRBs comprised in the first time-frequency resource;
   an overhead of first control information on the first time-frequency resource, wherein the first control information is carried on a physical sidelink control channel (PSCCH); or
   an overhead of second control information on the first time-frequency resource, wherein the second control information is carried on the PSSCH.

5. The method according to claim 1, wherein the number of REs on the first time-frequency resource that are allocated for the PSSCH satisfies:

$$N_{RE}=(N_{SC}^{PRB} \times N_{sym}^{sh'} - N_{DMRS}^{PRB} - x) \times M_{PSSCH}^{PRB} - N_{SCI1} - N_{SCI2},$$

where $N_{RE}$ represents the number of REs on the first time-frequency resource that are allocated for the PSSCH, $N_{SC}^{PRB}$ represents the number of subcarriers in one PRB, $N_{sym}^{sh'}$ represents the number of reference symbols for the PSSCH in one PRB in a first time unit, wherein the first time unit is a time domain length of the first time-frequency resource, $N_{DMRS}^{PRB}$ represents the overhead of the PSSCH DMRS in one PRB, x represents the overhead of a phase tracking reference signal (PTRS) and/or the overhead of a channel state information reference signal (CSI-RS) in one PRB, $M_{PSSCH}^{PRB}$, represents the number of PRBs comprised in the PSSCH, wherein the number of PRBs comprised in the PSSCH is the same as the number of PRBs comprised in the first time-frequency resource, $N_{SCI1}$ represents the overhead of first control information on the first time-frequency resource, wherein the first control information is carried on a physical sidelink control channel (PSCCH), and $N_{SCI2}$ represents the overhead of second control information on the first time-frequency resource, wherein the second control information is carried on the PSSCH.

6. An apparatus, comprising:
one or more processors, and
a non-transitory storage medium in communication with the one or more processors, wherein the non-transitory storage medium is configured to store program instructions, and wherein, when executed by the one or more processors, the instructions cause the apparatus to perform:
determining an overhead of a physical sidelink shared channel demodulation reference signal (PSSCH DMRS) in a physical resource block (PRB) of a first time-frequency resource, wherein the PSSCH DMRS is for demodulating a physical sidelink shared channel (PSSCH); and
determining, based on the overhead of the PSSCH DMRS, a number of resource elements (REs) on the first time-frequency resource that are allocated for the PSSCH, wherein the number of REs is for determining a transport block size (TBS) of the PSSCH;
wherein determining the overhead of the PSSCH DMRS is based on a demodulation reference signal (DMRS) configuration set, wherein the DMRS configuration set comprises one or more DMRS time domain pattern configurations, wherein each DMRS time domain pattern configuration indicates a specific number of DMRS symbols, wherein the DMRS configuration set is in a resource pool to which the first time-frequency resource belongs, and wherein the overhead $N_{DMRS}^{PRB}$ of the PSSCH DMRS satisfies:

| DMRS configuration set | $N_{DMRS}^{PRB}$ |
|---|---|
| {2} | 12 |
| {3} | 18 |
| {4} | 24 |
| {2, 3} | 15 |
| {2, 4} | 18 |
| {3, 4} | 21 |
| {2, 3, 4} | 18. |

7. The apparatus according to claim 6, wherein the DMRS configuration set is configured by a network side device or preconfigured.

8. The apparatus according to claim 6, wherein the resource pool is a set of time resources and frequency resources for sidelink communication.

9. The apparatus according to claim 6, wherein the number of REs on the first time-frequency resource that are allocated for the PSSCH is further related to at least one of the following:
   a number of subcarriers in one PRB;
   a number of reference symbols for the PSSCH in one PRB in a first time unit, wherein the first time unit is a time domain length of the first time-frequency resource;
   an overhead of a phase tracking reference signal (PTRS) and/or an overhead of a channel state information reference signal (CSI-RS) in one PRB;
   a number of PRBs comprised in the PSSCH, wherein the number of PRBs comprised in the PSSCH is the same as a number of PRBs comprised in the first time-frequency resource;
   an overhead of first control information on the first time-frequency resource, wherein the first control information is carried on a physical sidelink control channel (PSCCH); or
   an overhead of second control information on the first time-frequency resource, wherein the second control information is carried on the PSSCH.

10. The apparatus according to claim 6, wherein the number of REs on the first time-frequency resource that are allocated for the PSSCH satisfies:

$$N_{RE}=(N_{SC}^{PRB} \times N_{sym}^{sh'}-N_{DMRS}^{PRB}-x) \times M_{PSSCH}^{PRB}-N_{SCI1}-N_{SCI2},$$

where $N_{RE}$ represents the number of REs on the first time-frequency resource that are allocated for the PSSCH, $N_{SC}^{PRB}$ represents the number of subcarriers in one PRB, $N_{sym}^{sh'}$ represents the number of reference symbols for the PSSCH in one PRB in a first time unit, wherein the first time unit is a time domain length of the first time-frequency resource, $N_{DMRS}^{PRB}$ represents the overhead of the PSSCH DMRS in one PRB, x represents the overhead of a phase tracking reference signal (PTRS) and/or the overhead of a channel state information reference signal (CSI-RS) in one PRB, $M_{PSSCH}^{PRB}$, represents the number of PRBs comprised in the PSSCH, wherein the number of PRBs comprised in the PSSCH is the same as the number of PRBs comprised in the first time-frequency resource, $N_{SCI1}$ represents the overhead of first control information on the first time-frequency resource, wherein the first control information is carried on a physical sidelink control channel (PSCCH), and $N_{SCI2}$ represents the overhead of second control information on the first time-frequency resource, wherein the second control information is carried on the PSSCH.

11. A non-transitory computer readable storage medium, storing instructions, wherein when the instructions are executed, the following steps are performed:
determining an overhead of a physical sidelink shared channel demodulation reference signal (PSSCH DMRS) in a physical resource block (PRB) of a first time-frequency resource, wherein the PSSCH DMRS is for demodulating a physical sidelink shared channel (PSSCH); and
determining, based on the overhead of the PSSCH DMRS, a number of resource elements (REs) on the first time-frequency resource that are allocated for the PSSCH, wherein the number of REs is for determining a transport block size (TBS) of the PSSCH;
wherein determining the overhead of the PSSCH DMRS is based on a demodulation reference signal (DMRS) configuration set, wherein the DMRS configuration set comprises one or more DMRS time domain pattern configurations, wherein each DMRS time domain pattern configuration indicates a specific number of DMRS symbols, wherein the DMRS configuration set is in a resource pool to which the first time-frequency resource belongs, and wherein the overhead $N_{DMRS}^{PRB}$ of the PSSCH DMRS satisfies:

| DMRS configuration set | $N_{DMRS}^{PRB}$ |
|---|---|
| {2} | 12 |
| {3} | 18 |
| {4} | 24 |
| {2, 3} | 15 |
| {2, 4} | 18 |
| {3, 4} | 21 |
| {2, 3, 4} | 18. |

12. The medium according to claim 11, wherein the DMRS configuration set is configured by a network side device or preconfigured.

13. The medium according to claim 11, wherein the resource pool is a set of time resources and frequency resources for sidelink communication.

14. The medium according to claim 11, wherein the number of REs on the first time-frequency resource that are allocated for the PSSCH is further related to at least one of the following:
a number of subcarriers in one PRB;
a number of reference symbols for the PSSCH in one PRB in a first time unit, wherein the first time unit is a time domain length of the first time-frequency resource;
an overhead of a phase tracking reference signal (PTRS) and/or an overhead of a channel state information reference signal (CSI-RS) in one PRB;
a number of PRBs comprised in the PSSCH, wherein the number of PRBs comprised in the PSSCH is the same as a number of PRBs comprised in the first time-frequency resource;
an overhead of first control information on the first time-frequency resource, wherein the first control information is carried on a physical sidelink control channel (PSCCH); or
an overhead of second control information on the first time-frequency resource, wherein the second control information is carried on the PSSCH.

15. The medium according to claim 11, wherein the number of REs on the first time-frequency resource that are allocated for the PSSCH satisfies:

$$N_{RE}=(N_{SC}^{PRB} \times N_{sym}^{sh'}-N_{DMRS}^{PRB}-x) \times M_{PSSCH}^{PRB}-N_{SCI1}-N_{SCI2},$$

where $N_{RE}$ represents the number of REs on the first time-frequency resource that are allocated for the PSSCH, $N_{SC}^{PRB}$ represents the number of subcarriers in one PRB, $N_{sym}^{sh'}$ represents the number of reference symbols for the PSSCH in one PRB in a first time unit, wherein the first time unit is a time domain length of the first time-frequency resource, $N_{DMRS}^{PRB}$ represents the overhead of the PSSCH DMRS in one PRB, x represents the overhead of a phase tracking reference signal (PTRS) and/or the overhead of a channel state information reference signal (CSI-RS) in one PRB, $M_{PSSCH}^{PRB}$, represents the number of PRBs comprised in the PSSCH, wherein the number of PRBs comprised in the PSSCH is the same as the number of PRBs comprised in the first time-frequency resource, $N_{SCI1}$ represents the overhead of a first control information on the first time-frequency resource, wherein the first control information is carried on a physical sidelink control channel (PSCCH), and $N_{SCI2}$ represents the overhead of second control information on the first time-frequency resource, wherein the second control information is carried on the PSSCH.

* * * * *